US012732927B2

(12) United States Patent
Zhang et al.

(10) Patent No.: US 12,732,927 B2
(45) Date of Patent: Sep. 8, 2026

(54) UPLINK TIMING METHOD AND RELATED APPARATUS

(71) Applicant: Huawei Technologies Co., Ltd., Shenzhen (CN)

(72) Inventors: Lili Zhang, Beijing (CN); Jinlin Peng, Shanghai (CN); Xizeng Dai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 18/759,023

(22) Filed: Jun. 28, 2024

(65) Prior Publication Data

US 2024/0365256 A1 Oct. 31, 2024

Related U.S. Application Data

(63) Continuation of application No. PCT/CN2022/132260, filed on Nov. 16, 2022.

(30) Foreign Application Priority Data

Dec. 30, 2021 (CN) ........................ 202111663851.0

(51) Int. Cl.
*H04W 56/00* (2009.01)
*H04W 72/21* (2023.01)

(52) U.S. Cl.
CPC ... *H04W 56/0005* (2013.01); *H04W 56/0045* (2013.01); *H04W 72/21* (2023.01)

(58) Field of Classification Search
CPC ......... H04W 56/0005; H04W 56/0045; H04W 72/21; H04W 56/001; H04W 56/0025; H04W 56/00
See application file for complete search history.

(56) References Cited

U.S. PATENT DOCUMENTS 10,136,402 B2 * 11/2018 Cao .................... H04W 56/001
11,832,205 B2 * 11/2023 Ryu .................... H04W 56/006
12,120,566 B2 * 10/2024 Zhou .................... H04W 36/06
2018/0192386 A1 * 7/2018 Rudrapatna ....... H04W 56/0045
(Continued)

FOREIGN PATENT DOCUMENTS

CN 109788546 A 5/2019
CN 110167133 A 8/2019
(Continued)

OTHER PUBLICATIONS

3GPP TS 38.213 V16.7.0, Sep. 2021, "3rd Generation Partnership Project; Technical Specification Group Radio Access Network; NR; Physical layer procedures for control (Release 16)," 188 pages.
(Continued)

*Primary Examiner* — Faruk Hamza
(74) *Attorney, Agent, or Firm* — Conley Rose, P.C.

(57) ABSTRACT

A method includes receiving, by a terminal device, timing information; determining, by the terminal device, a first uplink sending moment based on the timing information and a synchronization signal; and sending, by the terminal device, an uplink signal to an access network device at the first uplink sending moment, wherein both the timing information and the synchronization signal are from a network device, and the access network device does not support downlink transmission.

12 Claims, 6 Drawing Sheets

(56) References Cited

U.S. PATENT DOCUMENTS

| | | | | |
|---|---|---|---|---|
| 2019/0141697 | A1* | 5/2019 | Islam | H04W 56/0045 |
| 2019/0223178 | A1* | 7/2019 | Bergström | H04W 72/0446 |
| 2019/0268869 | A1* | 8/2019 | Akkarakaran | H04W 72/0446 |
| 2020/0374826 | A1* | 11/2020 | Zhang | H04L 5/1469 |
| 2021/0168869 | A1* | 6/2021 | Gupta | H04L 27/2607 |
| 2025/0203528 | A1* | 6/2025 | Wakabayashi | H04B 17/202 |
| 2025/0310893 | A1* | 10/2025 | Cirik | H04W 52/242 |
| 2026/0046637 | A1* | 2/2026 | Krishnamurthy | H04B 7/024 |
| 2026/0122613 | A1* | 4/2026 | Abreu | H04W 68/02 |

FOREIGN PATENT DOCUMENTS

| | | | | |
|---|---|---|---|---|
| WO | WO-2013169036 A1 * | 11/2013 | | H04W 56/004 |
| WO | WO-2014117372 A1 * | 8/2014 | | H04W 56/0045 |
| WO | 2015130034 A1 | 9/2015 | | |
| WO | 2019096273 A1 | 5/2019 | | |

OTHER PUBLICATIONS

3GPP TS 38.321 V16.7.0, Dec. 2021, “3rd Generation Partnership Project; Technical Specification Group Radio Access Network; NR; Medium Access Control (MAC) protocol specification (Release 16),” 158 pages.

3GPP TS 38.300 V15.3.0, Sep. 2018, “3rd Generation Partnership Project; Technical Specification Group Radio Access Network; NR; NR and NG-RAN Overall Description; Stage 2 (Release 15),” XP051487393, total 92 pages.

* cited by examiner

UPLINK TIMING METHOD AND RELATED APPARATUS

CROSS-REFERENCE TO RELATED APPLICATIONS

This is a continuation of International Patent Application No. PCT/CN2022/132260 filed on Nov. 16, 2022, which claims priority to Chinese Patent Application No. 202111663851.0 filed on Dec. 30, 2021. The disclosures of the aforementioned applications are hereby incorporated by reference in their entireties.

TECHNICAL FIELD

This application relates to the field of communication technologies, and in particular, to an uplink timing method and a related apparatus.

BACKGROUND

Currently, an uplink timing advance mechanism is proposed for a network device to ensure that uplink transmission from different terminal devices in a same cell do not interfere with each other. To be specific, the network device controls, by controlling a timing advance (TA) for sending an uplink signal by each terminal device, synchronization of time at which uplink signals from different terminal devices arrive at the network device. In the TA mechanism, the terminal device uses start time at which a downlink synchronization signal is received as an uplink timing advance reference point, so that the terminal device sends the uplink signal to the network device at a time point advancing the TA by using the start time at which the downlink synchronization signal is received from the network device as a reference.

To enhance a capacity of an uplink (UL), it is proposed that uplink dense deployment/scheduling be used, that is, an access network device that performs only uplink transmission is placed in a macro base station (macro gNB). A terminal device that is far away from the macro base station may perform uplink transmission with the macro base station through the access network device, so that more and denser uplink transmission can be formed, and an uplink capacity can be expanded.

In the uplink dense deployment/scheduling, the access network device cannot send the downlink synchronization signal to the terminal device. Consequently, the terminal device cannot learn when to send the uplink signal to the access network device.

SUMMARY

Embodiments of this application provide an uplink timing method and a related apparatus, so that uplink timing ambiguity on an access network device that does not support downlink transmission can be eliminated.

According to a first aspect, an embodiment of this application provides an uplink timing method. The method may be performed by a terminal device or a chip configured in the terminal device. In the method, the terminal device receives timing information; the terminal device determines a first uplink sending moment based on the timing information and a synchronization signal; and the terminal device sends an uplink signal to an access network device at the first uplink sending moment, where both the timing information and the synchronization signal are from a network device, and the access network device does not support downlink transmission.

It may be learned that the terminal device may determine, based on the timing information and the synchronization signal from the network device, the first uplink sending moment for sending the uplink signal to the access network device that does not support downlink transmission. Therefore, when the terminal device does not have a downlink reference point from the access network device, the terminal device may obtain an actual reference point by using the timing information obtained from the network device, so that uplink timing ambiguity caused by the terminal device on the access network device that does not support downlink transmission can be eliminated.

In an optional implementation, the timing information includes at least one of a first time point and an offset; the first time point is a start time point, of a downlink time unit, that is determined based on the synchronization signal; and the first time point and/or the offset are/is used to determine an uplink timing reference point. The uplink timing reference point is a timing reference point used by the terminal device to send the uplink signal to the access network device.

When the timing information includes the first time point, the terminal device uses the first time point as the uplink timing reference point. When the timing information includes the offset, the terminal device determines the uplink timing reference point based on the offset and the first time point that is obtained by the terminal device. When the timing information includes the first time point and the offset, the terminal device also determines the uplink timing reference point based on the first time point and the offset. The offset is a time offset of the uplink timing reference point relative to the first time point, so that the uplink reference timing point is a time point at which the first time point advances the offset, or is a time point at which the first time point lags behind the offset. After determining the uplink timing reference point, the terminal device may determine the first uplink sending moment based on the uplink timing reference point. It may be learned that the terminal device may determine the actual reference point (the uplink timing reference point) by using the timing information, so that uplink timing ambiguity caused by the terminal device on the access network device can be eliminated.

In an optional implementation, the offset is determined based on a difference between a first path distance and a second path distance; and the first path distance is a distance between the terminal device and the network device, and the second path distance is a distance between the terminal device and the access network device. It may be learned that the offset is determined based on the distance between the terminal device and the network device and the distance between the terminal device and the access network device. Therefore, the terminal device determines the uplink timing reference point based on the offset, so that accuracy of uplink timing performed by the terminal device can be ensured.

In another optional implementation, the offset is determined based on a delay corresponding to a distance between the network device and the access network device, so that accuracy of uplink timing performed by the terminal device can also be ensured.

In another optional implementation, the timing information includes a first timing advance TA; and the first TA is a timing advance of the first uplink sending moment relative to a first time point, and the first time point is a start time point, of a downlink time unit, that is determined based on the synchronization signal.

When the timing information includes the first TA, the terminal device may determine, based on the first TA and the first time point, the first uplink sending moment for sending the uplink signal to the access network device. In other words, the first uplink sending moment is a moment at which the first time point advances the first TA.

In still another optional implementation, when the timing information includes the first TA, the timing information may further include a second TA, and the second TA is a timing advance of a second uplink sending moment relative to the first time point.

When the timing information further includes the second TA, the terminal device may determine, based on the second TA and the first time point, the second uplink sending moment for sending an uplink signal to the network device. In other words, the second uplink sending moment is a moment at which the first time point advances the second TA. Therefore, the terminal device may further send the uplink signal to the network device at the second uplink sending moment.

It may be learned that the terminal device may obtain, by using the timing information, the first TA used to determine the first uplink sending moment, or the terminal device may obtain, by using the timing information, the first TA used to determine the first uplink sending moment and the second TA used to determine the second uplink sending moment. Therefore, it may be ensured that timing used by the terminal device to send the uplink signal or uplink information to the network device can accurately match a delay caused by a distance on a current link. In addition, timing used by the terminal device to send the uplink signal or uplink information to the access network device can accurately match a delay caused by a distance on the current link.

Optionally, the first TA is included in the timing information, and the second TA is included in information different from the timing information. In other words, the terminal device may separately obtain the first TA and the second TA by using different information.

In an optional implementation, before receiving the timing information, the terminal device may further send a preamble to the access network device based on the first time point, where the preamble is used by the network device or the access network device to determine the timing information. It may be learned that the terminal device may also send the preamble to the access network device by using the first time point as a reference, to obtain the timing information.

In an optional implementation, when the timing information includes at least one of the first time point and the offset, the terminal device may further send a preamble or an uplink reference signal to the access network device based on the uplink timing reference point, where the first time point is the start time point, of the downlink time unit, that is determined based on the synchronization signal; and the terminal device receives a third TA from the network device, where the third TA is determined by the access network device based on the uplink timing reference and a start time point at which the access network device receives the preamble or the uplink reference signal; and that the terminal device determines a first uplink sending moment based on the timing information and a synchronization signal includes: the terminal device determines the first uplink sending moment based on the timing information, the synchronization signal, and the third TA.

It may be learned that after determining the uplink timing reference point based on the timing information, the terminal device may further send the preamble or the uplink reference signal to the access network device based on the uplink timing reference point, to obtain the third TA of the uplink timing reference point. Therefore, the terminal device may determine the first uplink sending moment based on the third TA and the uplink timing reference point. That is, the first uplink sending moment is a moment at which the uplink timing reference point advances the third TA.

According to a second aspect, this application further provides an uplink timing method. The method may be performed by a terminal device or a chip configured in the terminal device. In the method, the terminal device obtains timing information; the terminal device determines a first uplink sending moment based on the timing information; and the terminal device sends an uplink signal to an access network device at the first uplink sending moment, where the timing information is from a network device, and the access network device does not support downlink transmission.

It may be learned that the terminal device may determine, based on the obtained timing information, the first uplink sending moment for sending the uplink signal to the access network device. Therefore, when the terminal device does not have a downlink reference point from the access network device, the terminal device may obtain an actual reference point by using the obtained timing information, so that uplink timing ambiguity caused by the terminal device on the access network device that does not support downlink transmission can be eliminated.

In an optional implementation, that the terminal device determines a first uplink sending moment based on the timing information includes: The terminal device determines the first uplink sending moment based on the timing information and a synchronization signal, where both the timing information and the synchronization signal are from the network device. It may be learned that the terminal device may determine the first uplink sending moment based on the timing information and the synchronization signal from the network device, so that timing ambiguity on the access network device is eliminated.

According to a third aspect, this application further provides an uplink timing method. The method may be performed by a network device or a chip configured in the network device. The uplink timing method in this aspect corresponds to the uplink timing method in the first aspect, and the uplink timing method in this aspect is described from a network device side. In the method, the network device determines timing information; and the network device sends the timing information to a terminal device, where the timing information is used by the terminal device to determine a first uplink sending moment for sending an uplink signal to an access network device, and the access network device does not support downlink transmission.

It may be learned that the network device sends, to the terminal device, the timing information used to determine the first uplink sending moment for sending the uplink signal to the access network device. This helps the terminal device determine the first uplink sending moment based on the timing information, that is, helps the terminal device obtain an actual reference point from the network device, so that uplink timing ambiguity on the access network device that does not support downlink transmission is eliminated.

In an optional implementation, the timing information includes at least one of a first time point and an offset; the first time point is a start time point, of a downlink time unit, that is determined based on a synchronization signal; and the first time point and/or the offset are/is used to determine an uplink timing reference point. The uplink timing reference point is a timing reference point used by the terminal device to send the uplink signal to the access network device.

The timing information includes the first time point, and the first time point is the uplink timing reference point. Alternatively, the timing information includes the offset, and the offset is used by the terminal device to determine the uplink timing reference point. Alternatively, the timing information includes the first time point and the offset, the first time point and the offset are used by the terminal device to determine the uplink timing reference point, and the offset is a time offset of the uplink timing reference point relative to the first time point, so that the uplink reference timing point is a time point at which the first time point advances the offset, or the uplink reference timing point is a time point at which the first time point lags behind the offset.

In an optional implementation, the offset is determined based on a difference between a first path distance and a second path distance; and the first path distance is a distance between the terminal device and the network device, and the second path distance is a distance between the terminal device and the access network device. It may be learned that the offset is determined based on the distance between the terminal device and the network device and the distance between the terminal device and the access network device. This helps ensure accuracy of uplink timing performed by the terminal device.

In another optional implementation, the offset is determined based on a delay corresponding to a distance between the network device and the access network device. This also helps ensure accuracy of uplink timing performed by the terminal device.

In another optional implementation, the timing information includes a first timing advance TA; and the first TA is a timing advance of the first uplink sending moment relative to a first time point, that is, the first uplink sending moment is a moment at which the first time point advances the first TA. This manner helps the terminal device determine the first uplink sending moment. The first time point is a start time point, of a downlink time unit, that is determined based on a synchronization signal.

In still another optional implementation, when the timing information includes the first TA, the timing information may further include a second TA; and the second TA is a timing advance of a second uplink sending moment relative to the first time point, that is, the second uplink sending moment is a moment at which the first time point advances the second TA. This manner helps the terminal device determine the second uplink sending moment based on the second TA.

In other words, the network device may notify the terminal device of the first TA by using the timing information. This helps the terminal device determines the first uplink sending moment based on the first TA and the first time point. The network device may further notify the terminal device of the second TA by using the timing information. This helps the terminal device determines the second uplink sending moment based on the second TA and the first time point, and helps ensure that timing used by the terminal device to send the uplink signal or uplink information to the network device can accurately match a delay caused by a distance on a current link. In addition, this also helps ensure that timing used by the terminal device to send the uplink signal or uplink information to the access network device can accurately match a delay caused by a distance on the current link.

Optionally, when the timing information includes the second TA, the network device may further receive an uplink signal, where the uplink signal is sent by the terminal device at the second uplink sending moment.

In an optional implementation, that the network device determines timing information includes: The network device receives signal strength of a preamble received by the access network device, where the preamble is sent by the terminal device to the access network device; and the network device determines the timing information based on the signal strength of the preamble received by the access network device and preamble power configured by the network device for the terminal device.

It may be learned that the network device may determine the timing information based on the preamble power configured for the terminal device and the signal strength that is of the received preamble and that is reported by the access network device.

In an optional implementation, the network device may further receive a third TA, where the third TA is determined by the access network device based on the uplink timing reference point and a start time point at which the access network device receives a preamble or an uplink reference signal; and the network device sends the third TA to the terminal device. It may be learned that the network device may further forward, to the terminal device, the third TA determined by the access network device, so that the terminal device determines the first uplink sending moment based on the third TA and the uplink timing reference point.

According to a fourth aspect, this application further provides an uplink timing method. The method may be performed by an access network device or a chip configured in the access network device. The uplink timing method in this aspect corresponds to the uplink timing methods in the first aspect and the third aspect, and the uplink timing method in this aspect is described from a perspective of an access network device side. In the method, the access network device receives an uplink signal, where the access network device does not support downlink transmission; and the uplink signal is sent by a terminal device at a first uplink sending moment determined based on timing information and a synchronization signal, and the timing information and the synchronization signal are sent by a network device to the terminal device.

It may be learned that the uplink signal received by the access network device that does not support downlink transmission is sent by the terminal device at the first uplink moment determined based on the timing information and the synchronization signal from the network device. It may be learned that the timing information from the network device eliminates uplink timing ambiguity caused by the terminal device on the access network device that does not support downlink transmission.

In an optional implementation, the timing information includes at least one of a first time point and an offset; the first time point is a start time point, of a downlink time unit, that is determined based on the synchronization signal; and the first time point and/or the offset are/is used to determine an uplink timing reference point. The uplink timing reference point is a timing reference point used by the terminal device to send the uplink signal to the access network device.

In an optional implementation, the uplink timing reference point is determined based on the first time point and the offset, and the offset is a time offset of the uplink timing reference point relative to the first time point.

When the timing information includes the first time point, the terminal device uses the first time point as the uplink timing reference point. When the timing information includes the offset, the terminal device determines the uplink timing reference point based on the offset and the first time point that is obtained by the terminal device. When the timing information includes the first time point and the offset, the terminal device also determines the uplink timing reference point based on the first time point and the offset. The offset is a time offset of the uplink timing reference point relative to the first time point, so that the uplink reference timing point is a time point at which the first time point advances the offset, or is a time point at which the first time point lags behind the offset. After determining the uplink timing reference point, the terminal device may determine the first uplink sending moment based on the uplink timing reference point.

In an optional implementation, the offset is determined based on a difference between a first path distance and a second path distance; and the first path distance is a distance between the terminal device and the network device, and the second path distance is a distance between the terminal device and the access network device. It may be learned that the offset is determined based on the distance between the terminal device and the network device and the distance between the terminal device and the access network device, so that the terminal device determines the uplink timing reference point based on the offset. This may ensure accuracy of uplink timing performed by the terminal device.

In another optional implementation, the offset is determined based on a delay corresponding to a distance between the network device and the access network device, so that accuracy of uplink timing performed by the terminal device can also be ensured.

In another optional implementation, the timing information includes a first timing advance TA; and the first TA is a timing advance of the first uplink sending moment relative to a first time point, that is, the first uplink sending moment is a moment at which the first time point advances the first TA. The first time point is a start time point, of a downlink time unit, that is determined based on the synchronization signal.

In still another optional implementation, when the timing information includes the first TA, the timing information may further include a second TA; and the second TA is a timing advance of a second uplink sending moment relative to the first time point, that is, the second uplink sending moment is a moment at which the first time point advances the second TA.

In an optional implementation, before receiving the uplink signal, the access network device may further receive a preamble from the terminal device; the access network device determines the timing information based on the preamble; and the access network device sends the timing information to the network device, where the timing information includes an offset.

In an optional implementation, the access network device may further receive a preamble or an uplink reference signal from the terminal device; the access network device determines a third TA based on the uplink timing reference point and a start time point at which the access network device receives the preamble or the uplink reference signal; and the access network device sends the third TA to the network device, where the third TA is used by the terminal device to determine the first uplink sending moment.

It may be learned that the access network device may further determine the third TA based on the preamble or the uplink reference signal from the terminal device, and send the third TA to the network device, so that the network device forwards the third TA to the terminal device. This further helps the terminal device determine the first uplink sending moment based on the third TA.

According to a fifth aspect, this application further provides an uplink timing method. The method may be performed by an access network device or a chip configured in the access network device. In the method, the access network device receives an uplink signal, where the access device does not support downlink transmission, the uplink signal is sent by a terminal device at a first uplink sending moment determined based on timing information, and the timing information is sent by a network device to the terminal device.

It may be learned that the uplink signal received by the access network device that does not support downlink transmission is sent by the terminal device at the first uplink moment determined based on the timing information from the network device. It may be learned that the timing information from the network device eliminates uplink timing ambiguity caused by the terminal device on the access network device that does not support downlink transmission.

In an optional implementation, that the uplink signal is sent by the terminal device at the first uplink sending moment determined based on the timing information means that: the uplink signal is sent by the terminal device at the first uplink sending moment determined based on the timing information and a synchronization signal, and the timing information and the synchronization signal are sent by the network device to the terminal device. In other words, the uplink signal received by the access network device is sent by the terminal device at the first uplink sending moment determined based on the timing information and the synchronization signal from the network device.

According to a sixth aspect, this application further provides a communication apparatus. The communication apparatus has some or all functions of the terminal device that implements the method described in the first aspect, or has some or all functions of the network device that implements the method described in the second aspect, or has some or all functions of the access network device that implements the method described in the third aspect. For example, a function of the communication apparatus may include functions in some or all of embodiments of the terminal device in the first aspect of this application, or may include a function of separately implementing any embodiment of this application. The function may be implemented by hardware, or may be implemented by hardware executing corresponding software. The hardware or the software includes one or more units or modules corresponding to the function.

In a possible design, a structure of the communication apparatus may include a processing unit and a communication unit. The processing unit is configured to support the communication apparatus in performing a corresponding function in the foregoing method. The communication unit is configured to support communication between the communication apparatus and another communication apparatus. The communication apparatus may further include a storage unit. The storage unit is configured to be coupled to the processing unit and the communication unit, and stores program instructions and data for the communication apparatus.

In an implementation, the communication apparatus includes a processing unit and a communication unit. The processing unit is configured to control the communication unit to perform data/signaling receiving and sending.

The communication unit is configured to receive timing information; the processing unit is configured to determine a first uplink sending moment based on the timing information and a synchronization signal; and the communication unit is further configured to send an uplink signal to an access network device at the first uplink sending moment, where both the timing information and the synchronization signal are from a network device, and the access network device does not support downlink transmission.

In addition, for another optional implementation of the communication apparatus in this aspect, refer to related content in the first aspect. Details are not described herein again.

In another implementation, the communication apparatus includes a processing unit and a communication unit. The processing unit is configured to control the communication unit to perform data/signaling receiving and sending.

The communication unit is configured to obtain timing information; the processing unit is configured to determine a first uplink sending moment based on the timing information; and the communication unit is further configured to send an uplink signal to an access network device at the first uplink sending moment, where the timing information is from a network device, and the access network device does not support downlink transmission.

In addition, for another optional implementation of the communication apparatus in this aspect, refer to related content in the second aspect. Details are not described herein again.

In another implementation, the communication apparatus includes a processing unit and a communication unit. The processing unit is configured to control the communication unit to perform data/signaling receiving and sending.

The processing unit is configured to determine timing information; and the communication unit is configured to send the timing information to a terminal device, where the timing information is used by the terminal device to determine a first uplink sending moment for sending an uplink signal to an access network device, and the access network device does not support downlink transmission.

In addition, for another optional implementation of the communication apparatus in this aspect, refer to related content in the third aspect. Details are not described herein again.

In still another implementation, the communication apparatus includes a processing unit and a communication unit. The processing unit is configured to control the communication unit to perform data/signaling receiving and sending.

The communication unit is configured to receive an uplink signal, where the access network device does not support downlink transmission; and the uplink signal is sent by a terminal device at a first uplink sending moment determined based on timing information and a synchronization signal, and the timing information and the synchronization signal are sent by a network device to the terminal device.

In addition, for another optional implementation of the communication apparatus in this aspect, refer to related content in the fourth aspect. Details are not described herein again.

In still another implementation, the communication apparatus includes a processing unit and a communication unit. The processing unit is configured to control the communication unit to perform data/signaling receiving and sending.

The communication unit is configured to receive an uplink signal, where the access device does not support downlink transmission, the uplink signal is sent by a terminal device at a first uplink sending moment determined based on timing information, and the timing information is sent by a network device to the terminal device.

In addition, for another optional implementation of the communication apparatus in this aspect, refer to related content in the fifth aspect. Details are not described herein again.

In an example, the communication unit may be a transceiver or a communication interface, the storage unit may be a memory, and the processing unit may be a processor.

In an implementation, the communication apparatus includes a processor and a transceiver. The processor is configured to control the transceiver to perform data/signaling receiving and sending.

The transceiver is configured to receive timing information; the processor is configured to determine a first uplink sending moment based on the timing information and a synchronization signal; and the transceiver is further configured to send an uplink signal to an access network device at the first uplink sending moment, where both the timing information and the synchronization signal are from a network device, and the access network device does not support downlink transmission.

In addition, for another optional implementation of the uplink communication apparatus in this aspect, refer to related content in the first aspect. Details are not described herein again.

In another implementation, the communication apparatus includes a processor and a transceiver. The processor is configured to control the transceiver to perform data/signaling receiving and sending.

The transceiver is configured to obtain timing information; the processor is configured to determine a first uplink sending moment based on the timing information; and the transceiver is further configured to send an uplink signal to an access network device at the first uplink sending moment, where the timing information is from a network device, and the access network device does not support downlink transmission.

In addition, for another optional implementation of the communication apparatus in this aspect, refer to related content in the second aspect. Details are not described herein again.

In another implementation, the communication apparatus includes a processor and a transceiver. The processor is configured to control the transceiver to perform data/signaling receiving and sending.

The processor is configured to determine timing information; and the transceiver, configured to send the timing information to a terminal device, where the timing information is used by the terminal device to determine a first uplink sending moment for sending an uplink signal to an access network device, and the access network device does not support downlink transmission.

In addition, for another optional implementation of the communication apparatus in this aspect, refer to related content in the second aspect. Details are not described herein again.

In still another implementation, the communication apparatus includes a processor and a transceiver. The processor is configured to control the transceiver to perform data/signaling receiving and sending.

The transceiver is configured to receive an uplink signal, where the access network device does not support downlink transmission; and the uplink signal is sent by a terminal device at a first uplink sending moment determined based on timing information and a synchronization signal, and the timing information and the synchronization signal are sent by a network device to the terminal device.

In addition, for another optional implementation of the communication apparatus in this aspect, refer to related content in the third aspect. Details are not described herein again.

In another implementation, the communication apparatus includes a processor and a transceiver. The processor is configured to control the transceiver to perform data/signaling receiving and sending.

The transceiver is configured to receive an uplink signal, where the access device does not support downlink transmission, the uplink signal is sent by a terminal device at a first uplink sending moment determined based on timing information, and the timing information is sent by a network device to the terminal device.

In addition, for another optional implementation of the communication apparatus in this aspect, refer to related content in the fifth aspect. Details are not described herein again.

In another implementation, the communication apparatus includes a processor and a memory. The memory is configured to store a computer program or instructions, and the processor is configured to execute the computer program or the instructions in the memory, so that the method according to the first aspect is performed, or the method according to the second aspect is performed, or the method according to the third aspect is performed, or the method according to the fourth aspect is performed, or the method according to the fifth aspect is performed.

In another implementation, the communication apparatus is a chip or a chip system. The processing unit may also be represented as a processing circuit or a logic circuit. The transceiver unit may be an input/output interface, an interface circuit, an output circuit, an input circuit, a pin, a related circuit, or the like on the chip or the chip system.

In an implementation process, the processor may be configured to perform, for example, but not limited to, baseband-related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of an integrated circuit technology, increasingly more components may be integrated on a same chip. For example, the digital baseband processor and a plurality of application processors (for example, but not limited to, a graphics processing unit and a multimedia processor) may be integrated on a same chip. Such a chip may be referred to as a system on a chip (SoC). Whether the components are independently disposed on different chips or are disposed on one or more chips in an integrated manner usually depends on requirements of a product design. Implementation forms of the foregoing components are not limited in this embodiment of this application.

According to a seventh aspect, this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the foregoing information, the processor outputs the foregoing information to a transceiver, so that the transceiver transmits the information. After the foregoing information is outputted by the processor, other processing may further need to be performed on the information before the information arrives at the transceiver. Similarly, when the processor receives the foregoing input information, the transceiver receives the foregoing information, and inputs the information into the processor. Further, after the transceiver receives the foregoing information, other processing may need to be performed on the foregoing information and then the information is input into the processor.

Based on the foregoing principle, for example, the receiving timing information mentioned in the foregoing methods may be understood as inputting timing information by the processor.

Unless otherwise specified, operations such as sending and receiving related to the processor may be more generally understood as operations such as outputting, receiving, and inputting of the processor if the operations do not conflict with actual functions or internal logic of the operations in related descriptions, instead of operations such as sending and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

According to an eighth aspect, this application further provides a communication system. The system includes at least one terminal device, at least one network device, and at least one access network device in the foregoing aspects. In another possible design, the system may further include another device that interacts with the terminal device, the network device, and the access network device in the solutions provided in this application.

According to a ninth aspect, this application provides a computer-readable storage medium. The computer-readable storage medium stores a computer program or instructions, and the computer program or the instructions is/are used to implement the method according to the first aspect, or the method according to the second aspect, or the method according to the third aspect, or the method according to the fourth aspect, or the method according to the fifth aspect.

According to a tenth aspect, this application further provides a computer program product including instructions. When the computer program product is run on a computer, the method according to the first aspect, or the method according to the second aspect, or the method according to the third aspect, or the method according to the fourth aspect, or the method according to the fifth aspect is implemented.

According to an eleventh aspect, this application provides a chip system. The chip system includes a processor and an interface, the interface is configured to obtain a program or instructions, and the processor is configured to invoke the program or the instructions to implement or support a terminal device in implementing the function in the first aspect, or configured to invoke the program or the instructions to implement or support a network device in implementing the function in the second aspect, or configured to invoke the program or the instructions to implement or support an access network device in implementing the function in the third aspect, for example, determining or processing at least one of data and information in the foregoing methods. In a possible design, the chip system further includes a memory. The memory is configured to store program instructions and data for the terminal. The chip system may include a chip, or may include a chip and another discrete component.

DESCRIPTION OF EMBODIMENTS

The following clearly and completely describes technical solutions in embodiments of this application with reference to accompanying drawings in embodiments of this application.

To better understand an uplink timing method disclosed in embodiments of this application, a communication system to which embodiments of this application are applicable is described.

Figure 1:
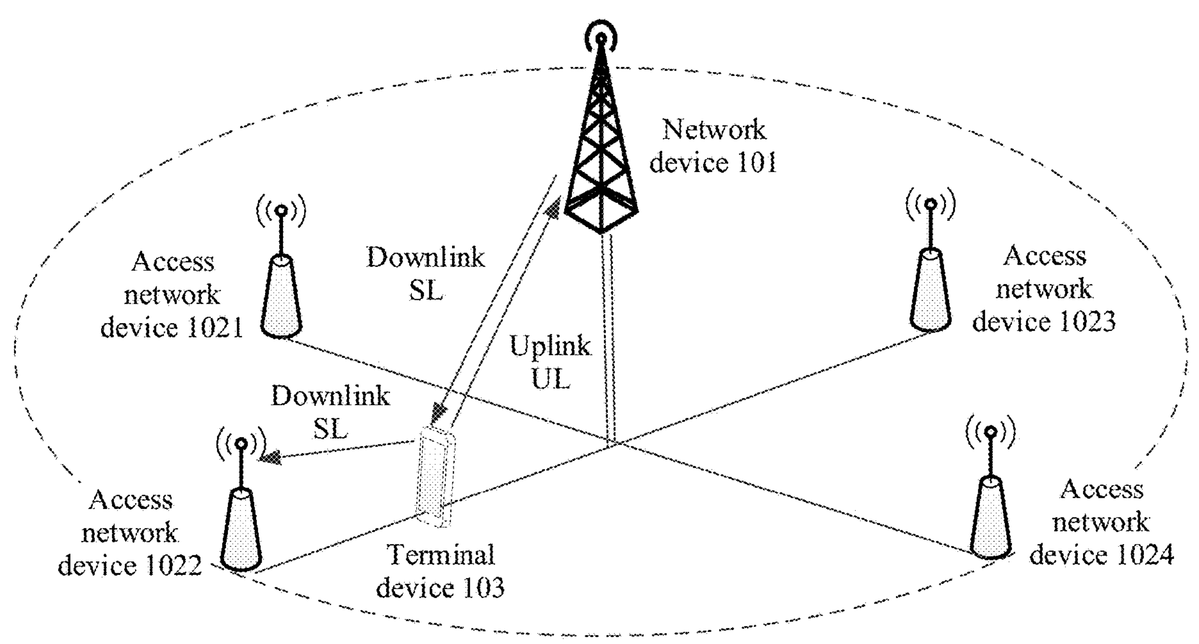
FIG. 1 is a diagram of a system architecture according to an embodiment of this application.

A system architecture provided in embodiments of this application is shown in FIG. 1. The system architecture includes a network device 101, an access network device 1021, an access network device 1022, an access network device 1023, an access network device 1024, and a terminal device 103. Quantities of network devices, access network devices, and terminal devices are not limited in embodiments of this application. FIG. 1 is described by using an example in which there is one network device, four access network devices, and one terminal device, the network device is a macro gNB, the access network device is a transmission reception point (TRP), and the terminal device is a mobile phone.

The network device and the terminal device may perform both UL transmission and downlink (DL) transmission. The access network device is a device that is placed in the macro base station and that performs only uplink transmission but does not perform downlink transmission. In other words, only uplink transmission can be performed between the access network device and the terminal device. A terminal device that is far away from the network device may send an uplink signal to the access network device, and then the access network device forwards the uplink signal to the network device. The access network device may use a new high spectrum (for example, 4.9 gigahertz (GHz)) or a higher high-frequency spectrum. The higher high-frequency spectrum includes a millimeter-wave frequency band.

It may be understood that the communication system to which embodiments of this application are applicable includes but is not limited to 5th generation (5G), new radio (NR), Long-Term Evolution (LTE), an internet of things (IoT), Wi-Fi, 3rd Generation Partnership Project (3GPP) related wireless communication, other wireless communication that may appear in the future, or the like.

In embodiments of this application, the network device and the access network device are devices that communicate with the terminal device. Both uplink transmission and downlink transmission can be performed between the network device and the terminal device, and only uplink transmission can be performed between the access network device and the terminal device.

Optionally, the network device or the access network device in embodiments of this application may include base stations in various forms, for example, a macro base station, a micro base station (also referred to as a small cell), a relay station (a relay/repeater/smart repeater), an access point, a device for implementing a function of a base station in the future, an access node in a Wi-Fi system, a TRP, a transmission point (TP), a mobile switching center, a device that undertakes a function of a base station in device-to-device (D2D), vehicle-to-everything (V2X), or machine-to-machine (M2M) communication, and the like. Optionally, the network device or the access network device in embodiments of this application may be a new radio base station (new radio eNB), a TRP, a macro or micro base station, a high-frequency base station, or an LTE macro or micro eNB. For example, the network device and the access network device in embodiments of this application may alternatively correspond to a baseband processing unit (BBU) and a remote radio unit (RRU) respectively. This is not specifically limited in embodiments of this application.

The terminal device in embodiments of this application may include various handheld devices, vehicle-mounted devices, wearable devices, or computing devices that have a wireless communication function, or other processing devices connected to a wireless modem. The terminal device may also be a user equipment (UE), an access terminal, a subscriber unit, a user agent, a cellular phone, a smartphone, a wireless data card, a personal digital assistant (PDA) computer, a tablet computer, a wireless modem (modem), a handheld device (handset), a laptop computer, a machine-type communication (MTC) terminal, a communication device carried on a high-altitude aircraft, a wearable device, an uncrewed aerial vehicle, a robot, a terminal in D2D communication, a terminal in V2X, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a future communication network, or the like. This is not limited in this application.

For ease of understanding of embodiments disclosed in this application, the following two points are described.

(1) In embodiments disclosed in this application, a scenario of a 5G NR network in a wireless communication network is used as an example of scenarios for description. It should be noted that solutions in embodiments disclosed in this application may be further applied to another wireless communication network, and a corresponding name may also be replaced with a name of a corresponding function in the another wireless communication network.

(2) Aspects, embodiments, or features of this application are presented in embodiments disclosed in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

To better understand the uplink timing method disclosed in embodiments of this application, related concepts in embodiments of this application are briefly described.

1. Uplink Timing Advance (TA) Mechanism

To ensure synchronization of time on a network device side, an uplink timing advance mechanism is proposed in an LTE system. An eNodeB controls, by controlling a TA for sending an uplink signal, synchronization of time at which uplink signals from different UEs arrive at a network device. A UE that is far away from the eNodeB has a long transmission delay. Therefore, the eNodeB controls the UE to send an uplink signal earlier than a UE near the eNodeB. That is, a TA of the UE that is far away from the eNodeB is greater than a TA of the UE near the eNodeB. The eNodeB notifies the UE of a TA value on a specific carrier by using a TA control command. It may be understood that the uplink TA mechanism is also applicable to a 5G system.

In the uplink TA mechanism, the terminal device uses a start time point of a received downlink synchronization signal as an uplink timing reference point. In other words, the terminal device sends an uplink signal to the network device at a time point advancing a TA of the start time point of the received downlink synchronization signal.

2. Supplementary Uplink Transmission and Uplink Dense Deployment/Scheduling

To expand an uplink capacity, a higher carrier frequency than that of LTE is used in a 5G communication system. The carrier frequency includes a frequency band in which 4.9 GHz is located, and a frequency greater than 6 GHz, for example, a frequency band of 28 GHz, 38 GHZ, or 60 GHz. This type of frequency is also referred to as a supplementary uplink carrier. A scenario in which the terminal device performs uplink transmission on the supplementary uplink carrier is referred to as supplementary uplink transmission. In the 5G communication system, wireless communication with larger bandwidth and a higher transmission rate is implemented through the supplementary uplink carrier.

Figure 2:
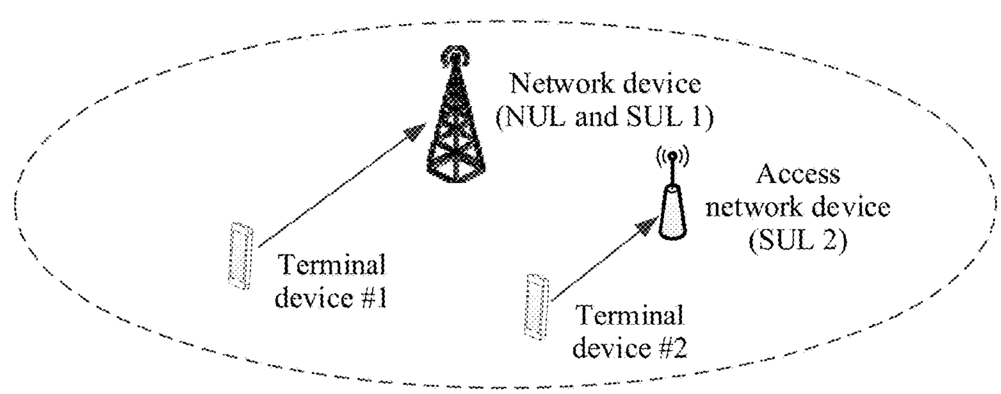
FIG. 2 is a diagram of a structure of supplementary uplink transmission according to an embodiment of this application.

Uplink dense deployment/scheduling means that the access network device (for example, a TRP) that performs only uplink receiving is placed in the network device. To be specific, as shown in FIG. 1, the network device and the terminal device perform both uplink transmission and downlink transmission, and the access network device and the terminal device perform only uplink transmission. The terminal device that is far away from the network device may communicate with the network device through the access network device, so that more and denser uplink transmission can be formed, and the uplink capacity can be expanded. Therefore, supplementary uplink transmission shown in FIG. 2 may be formed. As shown in FIG. 2, a terminal device #1 and the network device may use a normal uplink carrier (normal UL carrier, NUL) and a supplementary uplink carrier #1 (supplementary UL carrier 1, SUL 1), and a terminal device #2 and the access network device may use a supplementary uplink carrier #2 (SUL 2). The SUL 2 is a new high-frequency spectrum 4.9 GHz or a high-frequency spectrum. For example, the uplink dense deployment/scheduling shown in FIG. 2 is applicable to a factory area coverage scenario.

Figure 3:
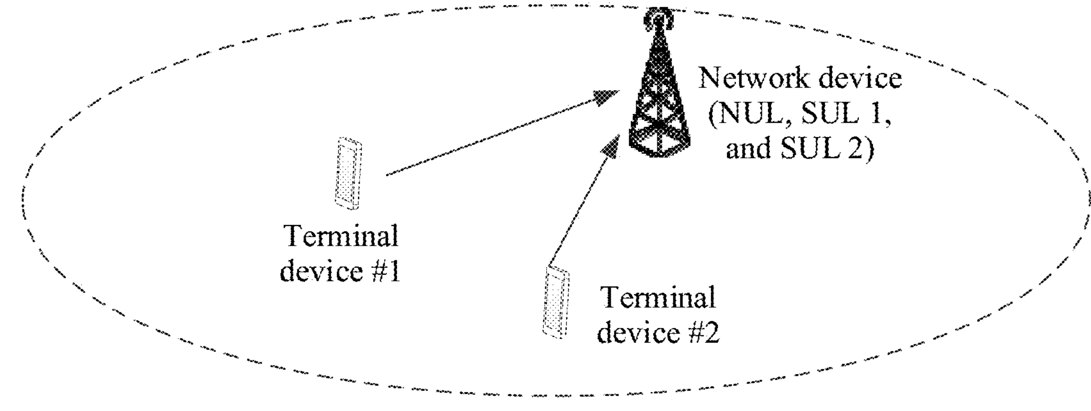
FIG. 3 is a diagram of a structure of co-site supplementary uplink transmission according to an embodiment of this application.

Currently, common supplementary uplink transmission is co-site supplementary uplink transmission shown in FIG. 3. As shown in FIG. 3, when the terminal device needs to expand the uplink capacity, an SUL and an NUL that are used by the network device are configured in the network device as a cell (cell). In addition, if two carriers are configured for the terminal device in a cell, when one of the two carriers is an NUL, and the other is an SUL 1 or several other supplementary uplink carriers (for example, an SUL 1 and an SUL 2), the supplementary uplink carrier and a common uplink carrier use a same TA and a same uplink timing reference point. To be specific, when using the supplementary uplink carrier, the terminal device uses a start time point at which a synchronization signal is received as an uplink timing reference point for sending an uplink signal to the network device, and uses a TA sent by the network device as a TA of the uplink timing reference point, so that the terminal device can determine a sending moment at which the uplink signal is sent to the network device through the supplementary uplink carrier.

Figure 4:
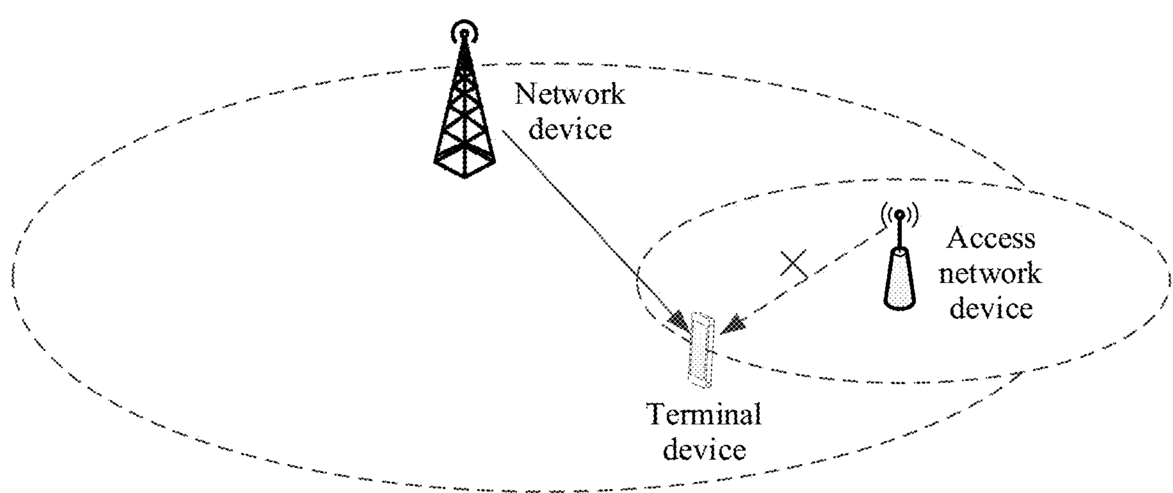
FIG. 4 is a diagram of a structure of inter-site supplementary uplink transmission according to an embodiment of this application.

However, in inter-site supplementary uplink transmission shown in FIG. 4, the access network device cannot send a downlink synchronization signal to the terminal device. Consequently, the terminal device cannot learn when to send the uplink signal to the access network device.

In this application, the start time point at which the synchronization signal is received may also be understood as a start time point at which the synchronization signal is received/detected. In this application, the uplink timing reference point may also be understood as an uplink timing reference moment, an uplink timing reference, or uplink timing.

In this application, the access network device does not support downlink transmission. In one case, it may be understood that the access network device is a device that supports only uplink transmission or can only perform receiving.

In this application, the access network device does not support downlink transmission. In another case, it may alternatively be understood that for the terminal device, the access network device does not support downlink transmission. In this case, the access network device has a downlink time unit, but the terminal device can perform communication only in an uplink time unit of the access network device. The access network device has a downlink time unit. It may be understood that in the downlink time unit, the access network device may send downlink data information or a downlink reference signal, but does not send a synchronization signal. It may alternatively be understood that in the downlink time unit, the access network device may send a synchronization signal, downlink data information, or a downlink reference signal, but downlink time units are less (that is, downlink slots used to obtain the synchronization signal are less or sparse). The downlink time units of the access network device occupy a small proportion in slot configuration of the device, and the access network device is an uplink-dominant (where uplink time units are more than the downlink time units) device.

Figure 5:
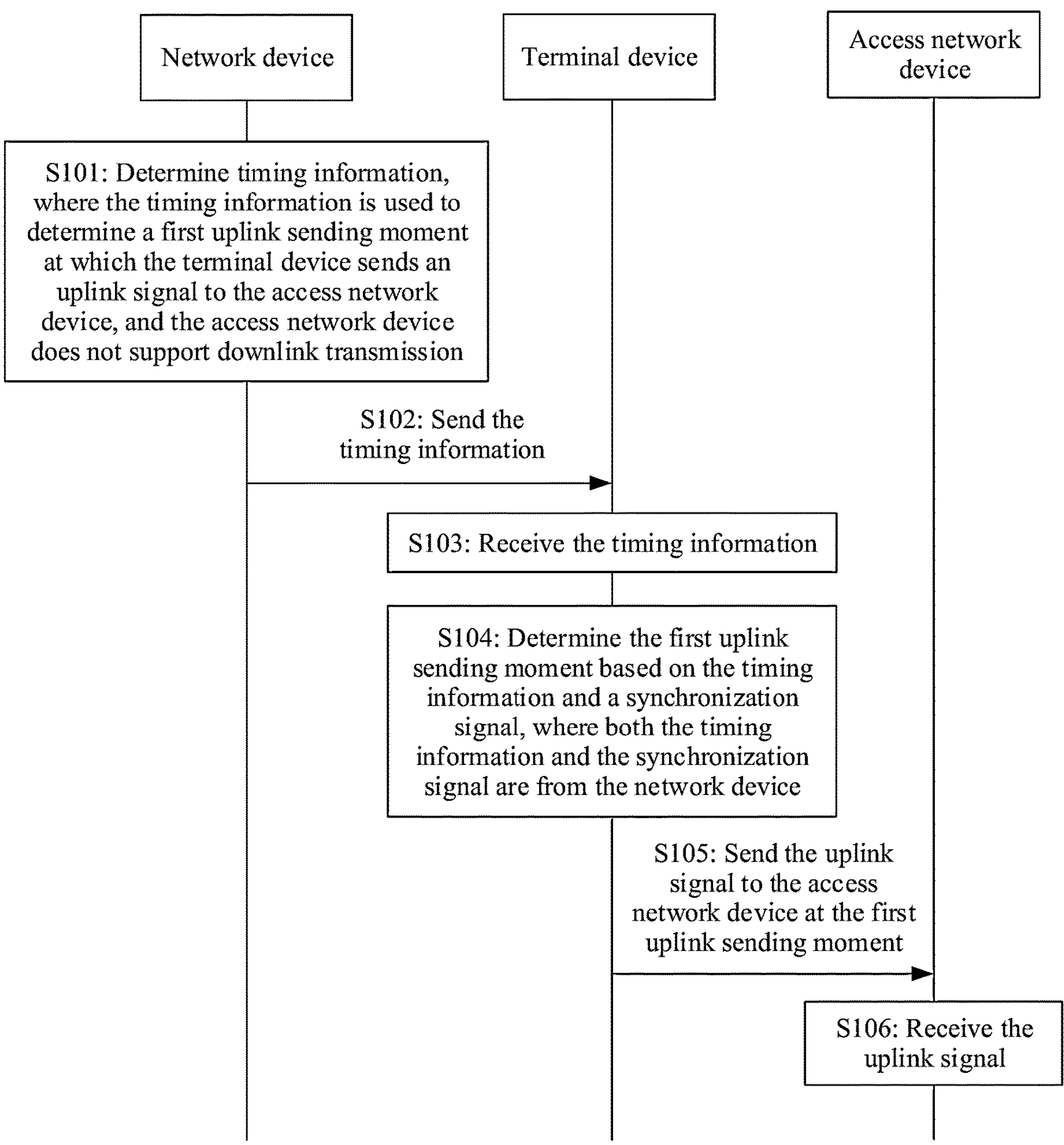
FIG. 5 is an interaction flowchart of an uplink timing method according to an embodiment of this application.

An embodiment of this application proposes an uplink timing method 100. FIG. 5 is an interaction flowchart of the uplink timing method 100. The uplink timing method 100 is described from a perspective of interaction between a terminal device, a network device, and an access device. The uplink timing method 100 includes but is not limited to the following steps.

S101: The network device determines timing information, where the timing information is used to determine a first uplink sending moment at which the terminal device sends an uplink signal to the access network device, and the access network device does not support downlink transmission.

S102: The network device sends the timing information to the terminal device.

S103: The terminal device receives the timing information.

In this embodiment of this application, the uplink signal may be at least one of uplink control information, uplink data information, an uplink reference signal, or the like. A specific form of the uplink signal is not limited in this embodiment of this application.

In this embodiment of this application, S102 is an optional step. Alternatively, S103 may be that the terminal device obtains the timing information. The timing information may be default or preset. Being preset means being preconfigured by the network device for the terminal device. For example, the network device is configured for the terminal device through operation, administration, and maintenance (OAM). Being default may mean being standard-prespecified.

The following describes several implementations of the timing information.

Implementation 1: The timing information includes a first time point, and the first time point is a start time point of a downlink time unit.

Optionally, the start time point of the downlink time unit is determined based on a synchronization signal. To be specific, the terminal device detects the synchronization signal, and determines the start time point of the downlink time unit based on the synchronization signal. The synchronization signal is a downlink synchronization signal sent by the network device to the terminal device.

The start time point of the downlink time unit may be a start moment of a downlink slot, a subframe, a mini-slot, or a mini-subframe. Alternatively, the start time point of the downlink time unit may be a start symbol of the downlink synchronization signal. The start symbol may alternatively be understood as a start moment of a symbol in which the start symbol is located. Alternatively, the start time point of the downlink time unit may be a start moment of a symbol after a start symbol of the downlink synchronization signal. The start moment of the symbol after the start symbol is a start moment of the first symbol after a timer ends, starting from the start symbol with the timer added.

Optionally, alternatively, the start time point of the downlink time unit may be a moment value. For example, the moment value is a subframe number or a time value.

When the timing information includes the first time point, an uplink timing reference point used by the terminal device to send the uplink signal to the access network device is the first time point. It may be learned that in this manner, the terminal device may learn of the uplink timing reference point by obtaining the timing information. In other words, when the terminal device does not have a downlink reference point from the access network device as the uplink timing reference point, the terminal device obtains an actual reference point from the network device by using the timing information, so that uplink timing ambiguity caused by the terminal device on the access network device can be eliminated.

Implementation 2: The timing information includes an offset, and the offset is used by the terminal device to determine an uplink timing reference point for sending the uplink signal to the access network device.

When the timing information includes the offset, the terminal device determines the uplink timing reference point based on a first time point and the offset. That the terminal device determines the uplink timing reference point based on a first time point and the offset is predefined. Being predefined may mean being notified by the network device, or being preset. The offset is a time offset of the uplink timing reference point relative to the first time point, to be specific, the uplink timing reference point is a time point at which the first time point advances or lags behind the offset.

In an optional implementation, the offset is determined by the network device based on a delay corresponding to a distance between the network device and the access network device. Alternatively, the offset is obtained by multiplying the delay by a scale factor, or is obtained by adding a fixed value to the delay value or subtracting a fixed value from the delay value, so that the determined offset is more accurate. The scale factor may be a fixed value, or may be a value determined based on the distance between the network device and the access network device, or may be determined based on a difference between a distance between the terminal device and the network device and a distance between the terminal device and the access network device.

For example, the delay corresponding to the distance between the network device and the access network device is 10 microseconds (μs), and the offset determined by the network device is 10 μs, or the offset determined by the network device is 10 μs*2, that is, the offset is 20 μs.

It may be learned that when determining the offset, the network device considers the delay value corresponding to the distance between the network device and the access network device and the relative distances between the terminal device and the network device and the access network device. Therefore, when the terminal device determines the uplink timing reference point based on the offset, this helps ensure accuracy of uplink timing.

In another optional implementation, the offset is determined by the network device based on a difference between a first path distance and a second path distance; and the first path distance is a distance between the terminal device and the network device, and the second path distance is a distance between the terminal device and the access network device.

It may be understood that the network device determines the first path distance based on signal strength or a path loss between the terminal device and the network device, and the network device determines the second path distance based on signal strength or a path loss between the terminal device and the access network device. Then, the network device determines the offset based on the first path distance and the second path distance.

In an optional implementation, after receiving the synchronization signal from the network device, the terminal device reports signal strength of the received synchronization signal to the network device. The network device determines the path loss between the terminal device and the network device based on the signal strength that is of the synchronization signal and that is reported by the terminal device and power for sending the synchronization signal by the network device, where the path loss is a difference between the power for sending the synchronization signal by the network device and the signal strength reported by the terminal device. Then, the network device may determine the first path distance based on the determined path loss between the terminal device and the network device, where the path loss is equivalent to taking a logarithm of the first path distance to the power of x.

Optionally, the network device may alternatively determine the first path distance according to a preset calculation formula based on the signal strength that is of the synchronization signal and that is reported by the terminal device and the power for sending the synchronization signal by the network device. In an example, the preset calculation formula may be: signal strength=k*transmit power*distance^x, where k is an antenna-related impact factor, x is a propagation factor or an attenuation factor, and distance^x is the distance to the power of x.

In an optional implementation, the terminal device sends a preamble or a measurement signal (for example, a sounding reference signal (SRS)) to the access network device based on the first time point. After receiving the preamble or the measurement signal, the access network device reports signal strength of the received preamble or the received measurement signal to the network device. The network device determines the path loss between the terminal device and the access network device based on the signal strength that is of the preamble or the measurement signal and that is reported by the access network device and power that is of the preamble or the measurement signal and that is configured by the network device for the terminal device, where the path loss is a difference between the power configured by the network device and the signal strength reported by the terminal device. Then, the network device may determine the second path distance based on the determined path loss between the terminal device and the access network device, where the path loss is equivalent to taking a logarithm of the second path distance to the power of x.

Optionally, the network device may alternatively determine the second path distance according to a preset calculation formula based on the signal strength that is of the preamble or the measurement signal and that is reported by the access network device and the transmit power that is of the preamble or the measurement signal and that is configured by the network device for the terminal device. In an example, the preset calculation formula may be: signal strength=k*transmit power*distance^x, where k is an antenna-related impact factor, x is a propagation factor or an attenuation factor, and distance^x is the distance to the power of x.

When the first path distance is greater than the second path distance, the offset is equal to the first path distance subtracting the second path distance, and the offset is an advance offset, that is, the offset is a time offset by which the uplink timing reference point advances the first time point. When the first path distance is greater than the second path distance, it indicates that the distance between the terminal device and the network device is greater than the distance between the terminal device and the access network device. Assuming that the access network device performs downlink transmission, and the network device and the access network device send synchronization signals to the terminal device at a same moment, the terminal device first receives the synchronization signal from the access network device. Therefore, if the network device uses a start time point at which the terminal device receives the synchronization signal from the network device as a reference, the offset may need to be an offset by which the start time point advances the first time point.

When the first path distance is less than the second path distance, the offset is equal to the second path distance subtracting the first path distance, and the offset is a lag offset, that is, the offset is a time offset by which the uplink timing reference point lags behind the first time point. When the second path distance is greater than the first path distance, it indicates that the distance between the terminal device and the access network device is greater than the distance between the terminal device and the network device. Assuming that the access network device performs downlink transmission, and the network device and the access network device send synchronization signals to the terminal device at a same moment, the terminal device first receives the synchronization signal from the network device. Therefore, if the network device uses a start time point at which the terminal device receives the synchronization signal from the network device as a reference, the offset may need to be an offset by which the start time point lags behind the first time point.

Figure 6A:
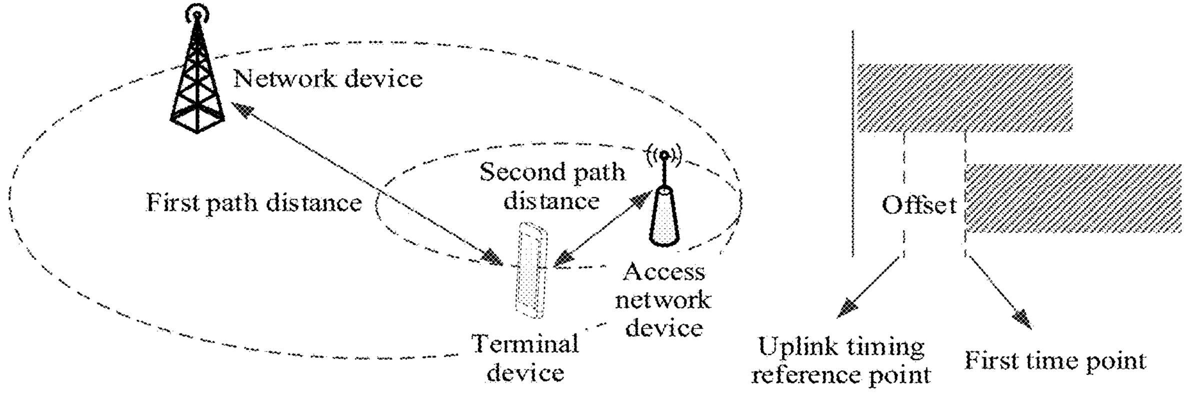
FIG. 6A is a diagram of an uplink timing reference point according to an embodiment of this application.
Figure 6B:
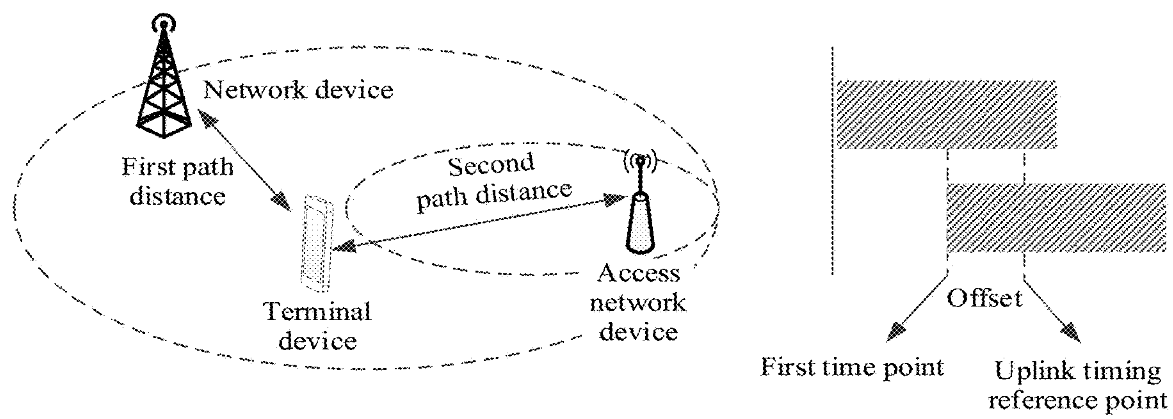
FIG. 6B is a diagram of another uplink timing reference point according to an embodiment of this application.

For example, as shown in FIG. 6A, when the first path distance is greater than the second path distance, the offset is the time offset by which the uplink timing reference point advances the first time point. As shown in FIG. 6B, when the second path distance is less than the second path distance, the offset is the time offset by which the uplink timing reference point lags behind the first time point.

In an optional implementation, the network device preconfigures values of a plurality of offsets for the terminal device by using signaling (for example, radio resource control (RRC) signaling). After determining the offset based on the first path distance and the second path distance, the network device indicates the offset to the terminal device according to an indication and a flag bit that correspond to the value of the offset. The terminal device may determine a value of an offset from the values of the plurality of offsets according to an indication corresponding to the value of the offset. The flag bit is "1" or "0", where "1" represents the advance offset, and "0" represents the lag offset; or "0" represents the advance offset, and "1" represents the lag offset. This is not limited in this embodiment of this application.

For example, the values, of the plurality of offsets, preconfigured by the network device for the terminal device by using the RRC signaling include 1, 3, 4, and 7. If an indication corresponding to "3" is "01", "O" represents the advance offset, and "1" represents the lag offset, when the network device determines that the offset is the lag offset and the value of the offset is 3, the network device indicates the value of the offset by using "01", and indicates that the offset is the lag offset by using "1", so that the terminal device determines, according to the indication of the network device, that the offset is the lag offset and the value of the offset is 3.

In another optional implementation, the network device preconfigures a plurality of advance offsets and lag offsets for the terminal device by using signaling. After determining the offset based on the first path distance and the second path distance, the network device indicates the offset to the terminal device according to an indication corresponding to the determined offset. Therefore, the terminal device determines the offset according to the indication.

For example, the offsets preconfigured by the network device for the terminal device by using the RRC signaling include −2, 4, 6, and −1. If the offset determined by the network device is 6, and a corresponding indication when the offset is 6 is "10", the network device indicates, to the terminal device by using "10", that the offset is 6. Therefore, the terminal device determines, by using "10", that the value of the offset is 6, and the offset is the advance offset.

In an optional implementation, when the network device detects that a change in a location of the terminal device, the network device may determine a change value of the offset or a changed offset based on the change in the location of the terminal device relative to the network device and the access network device, and send the change value of the offset or the changed offset to the terminal device, so that the terminal device updates the uplink timing reference point.

It may be learned that in an uplink dense deployment/scheduling scenario, when the terminal device does not have the downlink reference point from the access network device as the uplink timing reference point, the terminal device may not only obtain an actual reference point from the network device by using the timing information, but also eliminate uplink timing ambiguity caused by the terminal device on the access network device; and may also adjust the uplink timing reference point in a moving process in a timely manner. The adjusted uplink timing reference point is determined by the network device based on the distance between the terminal device and the network device and the distance between the terminal device and the access network device in the moving process, so that accuracy of uplink timing can be ensured.

Implementation 3: The timing information includes a first time point and an offset, and the first time point and the offset are used to determine an uplink timing reference point.

When the timing information includes the first time point and the offset, the uplink timing information is determined based on the first time point and the offset. The offset is a time offset of the uplink timing reference point relative to the first time point, to be specific, the uplink timing reference point is a time point at which the first time point advances the offset, or is a time point at which the first time point lags behind the offset.

For an implementation in which the network device determines the offset, refer to the implementation in the foregoing implementation 2. Details are not described again.

Correspondingly, for a determining manner of the uplink reference point, refer to the determining manner in the foregoing implementation 2. Details are not described again.

It may be learned that the network device may flexibly indicate at least one of the first time point and the offset to the terminal device by using the timing information, so that when the terminal device does not have a downlink reference point from the access network device as the uplink timing reference point, the terminal device may determine the uplink timing reference point based on the timing information, that is, the terminal device obtains an actual reference point from the network device by using the timing information, so that uplink timing ambiguity caused by the terminal device on the access network device can be eliminated.

Optionally, when the timing information includes the offset, the network device may further send the offset to the access network device, so that the access network device determines, based on the offset, the uplink timing reference point used by the terminal device, and further determines a third TA corresponding to the uplink timing reference point.

An interface between the network device and the access network device is an X2 interface, that is, the network device may send the offset to the network device by using X2 interface signaling.

Implementation 4: The timing information includes a first timing advance TA.

The first TA is a timing advance of the first uplink sending moment relative to a first time point. The first time point is a start time point, of a downlink time unit, that is determined based on a synchronization signal.

The first TA may be determined by the network device based on a delay corresponding to a distance between the network device and the access network device, or may be determined by the network device based on a delay corresponding to the foregoing first path distance and the foregoing second path distance. For a determining manner of the first TA, refer to the foregoing determining manner of the offset. Details are not described again.

For example, the terminal device sends a preamble to the network device, so that the network device determines a second TA used when the terminal device performs uplink transmission with the network device. When receiving the preamble, the network device determines the second TA. The network device further determines the first TA based on the second TA and the delay corresponding to the distance between the network device and the access network device in the determining manner of the offset in the foregoing implementation 2. Specifically, the offset is determined by the network device based on the delay corresponding to the distance between the network device and the access network device. Alternatively, the offset is obtained by multiplying the delay by a scale factor, or is obtained by adding a fixed value to the delay value or subtracting a fixed value from the delay value, so that the determined offset is more accurate. The first TA is obtained by superimposing the offset on the second TA. The second TA may advance the offset or lag behind the offset, that is, increase the offset or decrease the offset. Correspondingly, when the network device sends the first TA to the terminal device, the first TA already includes the value of the offset. That is, the first TA includes the second TA corresponding to the distance between the terminal device and the network device, and also includes the offset.

In other words, the network device may notify the terminal device of the first TA by using the timing information, to help the terminal device determine the first uplink sending moment based on the first TA and the first time point, that is, help eliminate uplink timing ambiguity caused by the terminal device on the access network device that does not support downlink transmission.

Implementation 5: The timing information includes a first TA and a second TA.

The first TA is a timing advance of the first uplink sending moment relative to a first time point, and the second TA is a timing advance of a second uplink sending moment relative to the first time point.

In other words, the network device may notify the terminal device of the first TA by using the timing information, to help the terminal device determine the first uplink sending moment based on the first TA and the first time point, and may also notify the terminal device of the second TA by using the timing information, to help the terminal device determine the second uplink sending moment based on the second TA and the first time point. Further, this helps the terminal device send the uplink signal to the access network device at the first uplink sending moment, and send the uplink signal to the network device at the second uplink sending moment.

Optionally, the first TA is included in the timing information, and the second TA is included in information different from the timing information. That is, the network device may separately indicate the first TA and the second TA to the terminal device by using different information.

For example, the second TA is included in a random access response (RAR) message. The first TA may be added to the RAR message. To be specific, the network device indicates the first TA to the terminal device as a separate information element (IE) in a random access response media access control control element (RAR MAC CE). In another example, the first TA may be included in another redefined MAC message. Optionally, the redefined MAC message may be a RAR message of a new structure. In another example, the first TA may alternatively be included in RRC signaling.

In an optional implementation, before sending the timing information to the terminal device, the network device sends a synchronization signal to the terminal device. Optionally, after sending the timing information to the terminal device, the network device sends the synchronization signal to the terminal device. The synchronization signal is used by the terminal device to perform downlink synchronization with the network device.

Correspondingly, before or after receiving the timing information, the terminal device may receive the synchronization signal from the network device, and perform downlink synchronization with the network device based on the synchronization signal.

In an optional implementation, before the terminal device receives the timing information, the terminal device may further send a preamble to the access network device based on the first time point. That is, the terminal device sends the preamble to the access network device by using the first time point as a reference. The preamble is used by the network device or the access network device to determine the timing information.

S104: The terminal device determines the first uplink sending moment based on the timing information and the synchronization signal, where both the timing information and the synchronization signal are from the network device.

Alternatively, the timing information is predefined, and the synchronization signal is from the network device.

The first uplink sending moment may be sending time of the uplink signal, a time domain resource for sending the uplink signal, or the like. This is not limited in this embodiment of this application.

There is a plurality of implementations for the timing information. Correspondingly, the terminal device determines the first uplink sending moment based on the timing information and the synchronization signal in a plurality of determining manners. The following describes, based on different implementations of the timing information, manners of determining the first uplink sending moment by the terminal device based on the timing information and the synchronization signal.

Determining manner 1: When the timing information includes the first time point, the terminal device determines the first time point as the uplink timing reference point, and then determines the first uplink sending moment based on the uplink timing reference point. Alternatively, the terminal device directly determines the first time point as the first uplink sending moment.

When the timing information includes the first time point, the uplink timing reference point is the first time point. The terminal device determines the first time point by receiving the synchronization signal from the network device. That is, based on detection or receiving of the synchronization signal, the terminal device uses the start time point of the downlink time unit as the first time point. Therefore, the terminal device uses the start time point of the downlink time unit as the uplink timing reference point.

The terminal device may send the preamble or an uplink reference signal to the access network device based on the uplink timing reference point, to obtain the third TA corresponding to the uplink timing reference point. That is, the terminal device sends the preamble or the uplink reference signal to the access network device by using the first time point as the reference.

Optionally, after receiving the synchronization signal from the network device, the terminal device reports, to the network device, the signal strength of the received synchronization signal. The network device determines the path loss between the network device and the terminal device based on the signal strength reported by the terminal device and the power for sending the synchronization signal to the terminal device, where the path loss is the difference between the power for sending the synchronization signal by the network device and the signal strength reported by the terminal device. Therefore, the network device may determine the distance between the network device and the terminal device based on the path loss, to determine a receiving delay of the terminal device relative to the network device. Further, the network device determines the start time point of the downlink time unit based on the start time point of the downlink time unit for sending the synchronization signal, that is, the network device determines the uplink timing reference point used by the terminal device to send the preamble or the uplink reference signal to the access network device. The network device sends the determined uplink timing reference point to the access network device. The access network device determines the third TA of the terminal device based on the uplink timing reference point used by the terminal device and the start time point at which the preamble or the uplink reference signal is received, where the third TA is a timing advance by which the first uplink sending moment advances the uplink timing reference point. The access network device sends the third TA to the network device, and the network device forwards the third TA to the terminal device. The access network device may send the third TA to the network device through a backhaul link between the access network device and the network device. The backhaul link may be an ideal backhaul link, an optical cable, or a wireless air interface.

Therefore, that the network device determines the first uplink sending moment based on the timing information and the synchronization signal includes: The terminal device determines the first uplink sending moment based on the timing information, the synchronization signal, and the third TA. In other words, the network device uses the first time point in the timing information as the uplink timing reference point, and then uses a moment at which the uplink timing reference point advances the third TA as the first uplink sending moment.

Optionally, after receiving the synchronization signal from the network device, the terminal device does not need to report, to the network device, the signal strength of the received synchronization signal. In this case, the access network device also detects the synchronization signal from the network device, to obtain the start time point of the downlink time unit. Therefore, the access network device uses the obtained start time point of the downlink time unit as a calibration point of the start time point at which the preamble or the uplink reference signal is received. In other words, the access network device determines the third TA of the terminal device based on the obtained start time point of the downlink time unit and the start time point at which the preamble or the uplink reference signal is received. The access network device may obtain the start time point of the downlink time unit based on detection on the synchronization signal.

Optionally, the access network device performs downlink synchronization with the network device in advance, so that the access network device determines the third TA of the terminal device based on the downlink time point at which the access network device performs downlink synchronization with the network device and the start time point at which the preamble or the uplink reference signal is received.

Determining manner 2: When the timing information includes the offset, the terminal device determines the uplink timing reference point based on the offset and the first time point, and then determines the first uplink sending moment based on the uplink timing reference point.

When the timing information includes the offset, the uplink timing reference point is determined based on the first time point and the offset. The first time point is determined by the terminal device by receiving the synchronization signal from the network device. Details are not described again. The offset is a time offset of the uplink timing reference point relative to the first time point, to be specific, the uplink reference point is a time point at which the first time point advances the offset, or is a time point at which the first time point lags behind the offset.

As shown in FIG. 6A, when the offset is the advance offset, the uplink timing reference point is a time point at which the first time point advances the offset. As shown in FIG. 6B, when the offset is the lag offset, the uplink timing reference point is a time point at which the first time point lags behind the offset.

Alternatively, the terminal device may send the preamble or the uplink reference signal to the access network device by using the uplink timing reference point as a reference, to obtain the third TA corresponding to the uplink timing reference point. For an implementation in which the terminal device obtains the third TA, refer to the manner in the foregoing determining manner 1. Details are not described again.

Figure 7A:
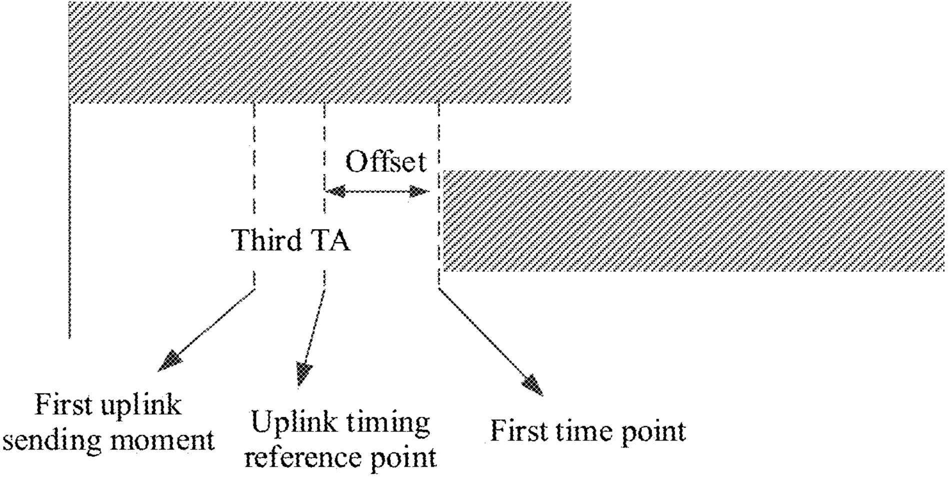
FIG. 7A is a diagram of a first uplink sending moment according to an embodiment of this application.
Figure 7B:
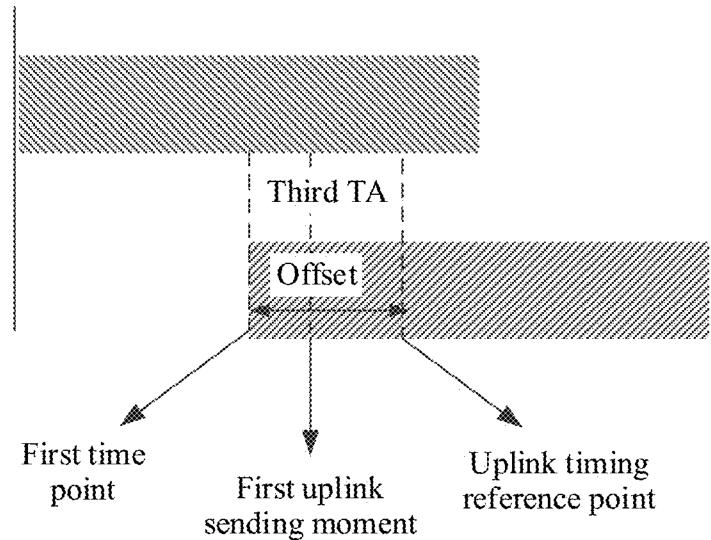
FIG. 7B is a diagram of another first uplink sending moment according to an embodiment of this application.

Then, the terminal device determines, based on the uplink timing reference point and the third TA, the first uplink sending moment for sending the uplink signal to the access network device, where the first uplink sending moment is a moment at which the uplink timing reference point advances the third TA. As shown in FIG. 7A, when the offset is the advance offset, the first uplink sending moment is a moment at which the first time point advances the offset and then advances the third TA. As shown in FIG. 7B, when the offset is the lag offset, the first uplink sending moment is a moment at which the first time point lags behind the offset and then advances the third TA.

In an optional implementation, the terminal device may further receive the change value of the offset or the changed offset from the network device.

When the terminal device receives the change value of the offset, the terminal device updates the offset based on the offset and the change value of the offset, and further updates the first uplink sending moment based on an updated offset. When the terminal device receives the changed offset, the terminal device determines an updated first uplink sending moment based on the changed offset and the first time point.

For example, the change value of the offset determined by the network device is a relative value using an initially delivered advance offset or lag offset as a reference. Correspondingly, the terminal device may determine the uplink timing reference point and the first uplink sending moment by sequentially superimposing determined first uplink time points. For example, an initial offset received by the terminal device is an advance offset, and a value of the offset is 2 μs. The first time point determined by the terminal device is a moment a, and the third TA is 0.4 μs. The change value of the offset received by the terminal device is 0.6 μs, and is also an advance offset. Therefore, the updated uplink timing reference point is a moment obtained after the moment a advances 2 μs and then advances 0.6 μs, and the updated first uplink sending moment is a moment obtained after the uplink timing reference point advances 0.4 μs.

For example, the change value of the offset determined by the network device is a relative value using a first reference point as a reference. Correspondingly, the terminal device superimposes the change value at the first time point, determines the uplink timing reference point, and determines the first uplink sending moment. For example, an initial offset received by the terminal device is an advance offset, and a value of the offset is 2 μs. The first time point determined by the terminal device is a moment a, and the third TA is 0.4 μs. The changed offset received by the terminal device is a lag offset, and the value of the offset is 1.5 μs. Therefore, the updated uplink timing reference point is a moment at which the moment a lags behind 1.5 μs, and the updated first uplink sending moment is a moment at which the moment a lags behind 1.5 μs and then the moment a advances 0.4 μs.

Determining manner 3: When the timing information includes the first time point and the offset, the terminal device determines the uplink timing reference point based on the first time point and the offset, and then determines the first uplink sending moment based on the uplink timing reference point.

When the timing information includes the first time point and the offset, the uplink timing reference point is also determined based on the first time point and the offset. The first time point is determined by the terminal device by receiving the synchronization signal, and a determining manner of the first time point is not described again.

For both the implementation in which the terminal device determines the uplink timing reference point based on the first time point and the offset and the implementation in which the terminal device determines the first uplink sending moment based on the uplink timing reference point, refer to the implementation in the foregoing determining manner 2. Details are not described again.

Determining manner 4: When the timing information includes the first TA, the terminal device determines the first uplink sending moment based on the first time point and the first TA.

When the timing information includes the first TA, the first uplink sending moment is a moment at which the first time point advances the first TA. An implementation in which the terminal device obtains the first time point is the same as that described above. Details are not described again.

Determining manner 5: When the timing information includes the first TA and the second TA, the terminal device determines the first uplink sending moment based on the first time point and the first TA, and determines the second uplink sending moment based on the first time point and the second TA.

When the timing information includes the first TA and the second TA, the first uplink sending moment is a moment at which the first time point advances the first TA, and the second uplink sending moment is a moment at which the first time point advances the second TA. An implementation in which the terminal device obtains the first time point is the same as that described above. Details are not described again.

It may be learned that when the timing information includes the first TA and the second TA, the terminal device determines both the first uplink sending moment for sending the uplink signal to the access network device and the second uplink sending moment for sending the uplink signal to the network device. Therefore, the terminal device may send the uplink signal to the access network device at the first uplink sending moment, and may also send the uplink signal to the network device at the second uplink sending moment. Therefore, it may be ensured that timing used by the terminal device to send the uplink signal or uplink information to the network device can accurately match a delay caused by a distance on a current link. In addition, timing used by the terminal device to send the uplink signal or uplink information to the access network device can accurately match a delay caused by a distance on the current link.

In this embodiment of this application, in an uplink dense deployment/scheduling scenario, when the terminal device does not have the downlink reference point from the access network device, the terminal device may obtain the actual reference point by obtaining the timing information from the network device. To be specific, the terminal device may determine, by using the obtained timing information, the uplink timing reference point for sending the uplink signal to the access network device, and further determine the first sending moment for sending the uplink signal to the access network device, to eliminate uplink timing ambiguity caused by the terminal device on the access network device.

S105: The terminal device sends the uplink signal to the access network device at the first uplink sending moment.

Optionally, the terminal device sends the uplink information to the access network device at the first uplink sending moment. The uplink information includes a physical uplink shared channel (PUSCH) or a physical uplink control channel (PUCCH).

Optionally, the terminal device sends the uplink signal or the uplink information to the network device at the second uplink sending moment.

S106: The access network device receives the uplink signal.

Optionally, the access network device receives the uplink information.

In an optional implementation, before receiving the uplink signal, the access network device receives the preamble from the terminal device. The access network device sends, to the network device, the signal strength of the received preamble, so that the network device determines the timing information based on the signal strength of the preamble received by the access network device. Alternatively, the access network device determines the timing information based on the preamble, and sends the determined timing information to the network device, so that the network device delivers the timing information to the terminal device. In this application, receiving may also be understood as detection. Being received may also be understood as being detected.

In an optional implementation, the network device sends, to the access network device, the transmit power that is of the preamble and that is configured for the terminal device, and the access network device determines the distance between the terminal device and the access network device based on the signal strength of the received preamble and the transmit power of the preamble. The distance corresponds to a time difference, and the time difference is the first TA value. Then, the access network device sends the first TA value to the network device, to help the network device send the first TA value as the timing information to the terminal device.

In another optional implementation, the access network device sends the signal strength of the received preamble to the network device. Therefore, the network device determines the distance between the terminal device and the access network device based on the signal strength of the preamble received by the access network device and the transmit power that is of the preamble and that is configured by the network device for the terminal device. The distance corresponds to a time difference, and the time difference is the first TA value. Then, the network device sends the first TA value as the timing information to the terminal device.

In this embodiment of this application, the network device sends, to the terminal device, the timing information used to determine the first uplink sending moment for sending the uplink signal to the access network device, and the access network device does not support downlink transmission. Therefore, the terminal device may determine the first uplink sending moment based on the timing information, and send the uplink signal to the access network device at the first uplink sending moment. It may be learned that in this manner, uplink timing ambiguity caused by the terminal device on the access network device that does not support downlink transmission is eliminated.

To implement the functions in the method provided in embodiments of this application, the terminal device, the network device, the access network device may include a hardware structure and/or a software module, to implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 8:
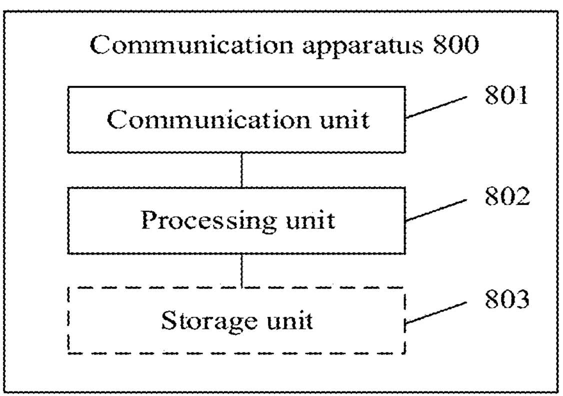
FIG. 8 is a diagram of a structure of a communication apparatus according to an embodiment of this application.

As shown in FIG. 8, an embodiment of this application provides a communication apparatus 800. The communication apparatus 800 may be a component (for example, an integrated circuit or a chip) of a terminal device, or may be a component (for example, an integrated circuit or a chip) of a network device, or may be a component (for example, an integrated circuit or a chip) of an access network device. Alternatively, the communication apparatus 800 may be another communication unit, configured to implement the method in method embodiments of this application. The communication apparatus 800 may include a communication unit 801 and a processing unit 802. Optionally, the communication apparatus 800 may further include a storage unit 803.

In a possible design, one or more units in FIG. 8 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be separately disposed, or may be integrated.

The communication apparatus 800 can implement functions of the terminal device described in embodiments of this application. Optionally, the communication apparatus 800 can implement functions of the network device described in embodiments of this application. Optionally, the communication apparatus 800 can implement functions of the access network device described in embodiments of this application. For example, the communication apparatus 800 includes a module, a unit, or a means corresponding to a terminal device performing the steps related to the terminal device described in embodiments of this application. The function, the unit, or the means may be implemented by software or hardware, or may be implemented by hardware executing corresponding software, or may be implemented by a combination of software and hardware. For details, refer to corresponding descriptions in the foregoing corresponding method embodiments.

In a possible design, the communication apparatus 800 may include a processing unit 802 and a communication unit 801. The processing unit 802 is configured to control the communication unit 801 to perform data/signaling receiving and sending.

The communication unit 801 is configured to receive timing information; the processing unit 802 is configured to determine a first uplink sending moment based on the timing information and a synchronization signal; and the communication unit 801 is further configured to send an uplink signal to an access network device at the first uplink sending moment, where both the timing information and the synchronization signal are from a network device, and the access network device does not support downlink transmission.

In an optional implementation, the timing information includes at least one of a first time point and an offset; the first time point is a start time point, of a downlink time unit, that is determined based on the synchronization signal; and the first time point and/or the offset are/is used to determine an uplink timing reference point. The uplink reference timing point is a time point at which the first time point advances the offset, or is a time point at which the first time point lags behind the offset.

In an optional implementation, the uplink timing reference point is determined based on the first time point and the offset, and the offset is a time offset of the uplink timing reference point relative to the first time point.

In an optional implementation, the offset is determined based on a difference between a first path distance and a second path distance; and the first path distance is a distance between the communication apparatus 800 and the network device, and the second path distance is a distance between the communication apparatus 800 and the access network device.

In another optional implementation, the offset is determined based on a delay corresponding to a distance between the network device and the access network device.

In another optional implementation, the timing information includes a first timing advance TA; and the first TA is a timing advance of the first uplink sending moment relative to a first time point, and the first time point is a start time point, of a downlink time unit, that is determined based on the synchronization signal.

In still another optional implementation, when the timing information includes the first TA, the timing information further includes a second TA, and the second TA is a timing advance of a second uplink sending moment relative to the first time point. The communication unit 801 may further send an uplink signal to the network device at the second uplink sending moment.

In an optional implementation, before the communication unit 801 receives the timing information, the processing unit 802 may further send a preamble to the access network device based on the first time point, where the preamble is used by the network device or the access network device to determine the timing information.

In an optional implementation, when the timing information includes at least one of the first time point and the offset, the processing unit 802 may further send a preamble or an uplink reference signal to the access network device based on the uplink timing reference point, where the first time point is a start time point, of a downlink time unit, that is determined based on the synchronization signal. The communication unit 801 receives a third TA from the network device, where the third TA is determined by the access network device based on the uplink timing reference and a start time point at which the access network device receives the preamble or the uplink reference signal. Therefore, that the processing unit 802 determines the first uplink sending moment based on the timing information and the synchronization signal includes: determining the first uplink sending moment based on the timing information, the synchronization signal, and the third TA.

This embodiment of this application and the foregoing method embodiment are based on a same concept, and bring same technical effect. For a specific principle, refer to the descriptions of the foregoing embodiment. Details are not described again.

In a possible design, the communication apparatus 800 may include a processing unit 802 and a communication unit 801. The processing unit 802 is configured to control the communication unit 801 to perform data/signaling receiving and sending.

The communication unit 801 is configured to obtain timing information; the processing unit 802 is configured to determine a first uplink sending moment based on the timing information; and the communication unit 801 is configured to send an uplink signal to an access network device at the first uplink sending moment, where the timing information is from a network device, and the access network device does not support downlink transmission.

In an optional implementation, that the terminal device determines a first uplink sending moment based on the timing information includes: The terminal device determines the first uplink sending moment based on the timing information and a synchronization signal, where both the timing information and the synchronization signal are from the network device.

This embodiment of this application and the foregoing method embodiment are based on a same concept, and bring same technical effect. For a specific principle, refer to the descriptions of the foregoing embodiment. Details are not described again.

In another possible design, the communication apparatus 800 may include a processing unit 802 and a communication unit 801. The processing unit 802 is configured to control the communication unit 801 to perform data/signaling receiving and sending.

The processing unit 802 is configured to determine timing information; and the communication unit 801 is configured to send the timing information to a terminal device, where the timing information is used by the terminal device to determine a first uplink sending moment for sending an uplink signal to an access network device, and the access network device does not support downlink transmission.

In an optional implementation, the timing information includes at least one of a first time point and an offset; the first time point is a start time point, of a downlink time unit, that is determined based on a synchronization signal; and the first time point and/or the offset are/is used to determine an uplink timing reference point.

In an optional implementation, the offset is determined based on a difference between a first path distance and a second path distance; and the first path distance is a distance between the terminal device and a network device, and the second path distance is a distance between the terminal device and the access network device. The uplink reference timing point is a time point at which the first time point advances the offset, or is a time point at which the first time point lags behind the offset.

In another optional implementation, the offset is determined based on a delay corresponding to a distance between the network device and the access network device.

In another optional implementation, the timing information includes a first timing advance TA; and the first TA is a timing advance of the first uplink sending moment relative to a first time point, and the first time point is a start time point, of a downlink time unit, that is determined based on a synchronization signal.

In still another optional implementation, when the timing information includes the first TA, the timing information further includes a second TA, and the second TA is a timing advance of a second uplink sending moment relative to the first time point. The communication unit 801 may further receive an uplink signal, where the uplink signal is sent by the terminal device at the second uplink sending moment.

In an optional implementation, that the processing unit 802 determines timing information includes: receiving signal strength of a preamble received by the access network device, where the preamble is sent by the terminal device to the access network device; and determining the timing information based on the signal strength of the preamble received by the access network device and preamble power configured by the network device for the terminal device.

In an optional implementation, the communication unit 801 may further receive a third TA, where the third TA is determined by the access network device based on the uplink timing reference point and a start time point at which the access network device receives a preamble or an uplink reference signal; and the network device sends the third TA to the terminal device.

This embodiment of this application and the foregoing method embodiment are based on a same concept, and bring same technical effect. For a specific principle, refer to the descriptions of the foregoing embodiment. Details are not described again.

In still another possible design, the communication apparatus 800 may include a processing unit 802 and a communication unit 801. The processing unit 802 is configured to control the communication unit 801 to perform data/signaling receiving and sending.

The communication unit 801 is configured to receive an uplink signal, where the access network device does not support downlink transmission; and the uplink signal is sent by a terminal device at a first uplink sending moment determined based on timing information and a synchronization signal, and the timing information and the synchronization signal are sent by a network device to the terminal device.

In an optional implementation, the timing information includes at least one of a first time point and an offset; the first time point is a start time point, of a downlink time unit, that is determined based on the synchronization signal; and the first time point and/or the offset are/is used to determine an uplink timing reference point. The uplink reference timing point is a time point at which the first time point advances the offset, or is a time point at which the first time point lags behind the offset.

In an optional implementation, the uplink timing reference point is determined based on the first time point and the offset, and the offset is a time offset of the uplink timing reference point relative to the first time point.

In an optional implementation, the offset is determined based on a difference between a first path distance and a second path distance; and the first path distance is a distance between the terminal device and the network device, and the second path distance is a distance between the terminal device and the access network device.

In another optional implementation, the offset is determined based on a delay corresponding to a distance between the network device and the access network device.

In another optional implementation, the timing information includes a first timing advance TA; and the first TA is a timing advance of the first uplink sending moment relative to a first time point, and the first time point is a start time point, of a downlink time unit, that is determined based on the synchronization signal.

In still another optional implementation, when the timing information includes the first TA, the timing information further includes a second TA, the second TA is a timing advance of a second uplink sending moment relative to the first time point, and the second uplink sending moment is a moment at which the terminal device sends an uplink signal to the network device.

In an optional implementation, before receiving the uplink signal, the communication unit 801 may further receive a preamble from the terminal device; the processing unit 802 determines the timing information based on the preamble; and the communication unit 801 sends the timing information to the network device.

In an optional implementation, the communication unit 801 may further receive a preamble or an uplink reference signal from the terminal device; the processing unit 802 determines a third TA based on the uplink timing reference point and a start time point at which the access network device receives the preamble or the uplink reference signal; and the communication unit 801 sends the third TA to the network device, where the third TA is used by the terminal device to determine the first uplink sending moment.

This embodiment of this application and the foregoing method embodiment are based on a same concept, and bring same technical effect. For a specific principle, refer to the descriptions of the foregoing embodiment. Details are not described again.

In still another possible design, the communication apparatus 800 may include a processing unit 802 and a communication unit 801. The processing unit 802 is configured to control the communication unit 801 to perform data/signaling receiving and sending.

The communication unit 801 is configured to receive an uplink signal, where the access device does not support downlink transmission, the uplink signal is sent by a terminal device at a first uplink sending moment determined based on timing information, and the timing information is sent by a network device to the terminal device.

In an optional implementation, that the uplink signal is sent by the terminal device at the first uplink sending moment determined based on the timing information means that: the uplink signal is sent by the terminal device at the first uplink sending moment determined based on the timing information and a synchronization signal, and the timing information and the synchronization signal are sent by the network device to the terminal device.

This embodiment of this application and the foregoing method embodiment are based on a same concept, and bring same technical effect. For a specific principle, refer to the descriptions of the foregoing embodiment. Details are not described again.

Figure 9:
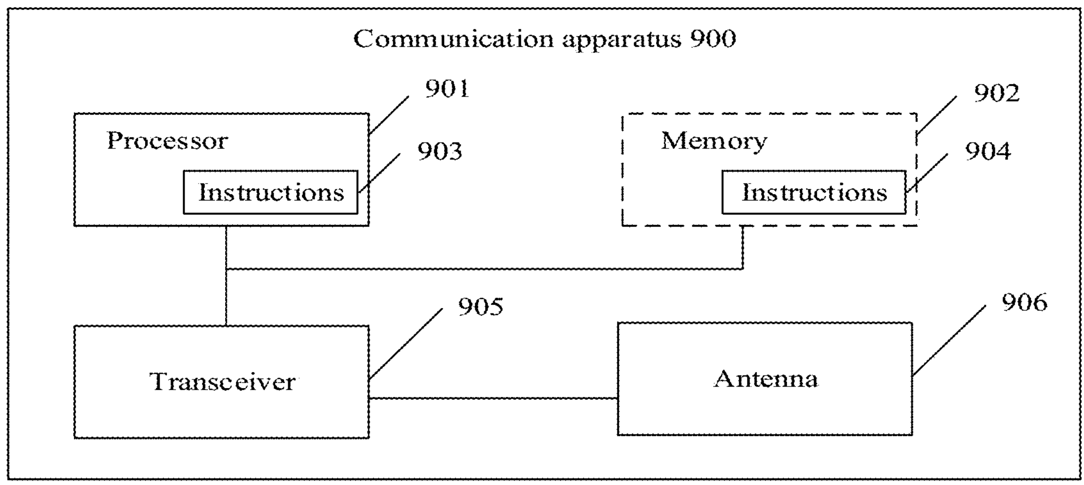
FIG. 9 is a diagram of a structure of another communication apparatus according to an embodiment of this application.

An embodiment of this application further provides a communication apparatus 900. FIG. 9 is a diagram of a structure of the communication apparatus 900. The communication apparatus 900 may be a terminal device, a network device, or an access network device, or may be a chip, a chip system, a processor, or the like that supports the terminal device in implementing the foregoing method, or may be a chip, a chip system, a processor, or the like that supports the network device in implementing the foregoing method, or may be a chip, a chip system, a processor, or the like that supports the access network device in implementing the foregoing method. The apparatus may be configured to implement the method described in the foregoing method embodiments. For details, refer to the descriptions in the foregoing method embodiments.

The communication apparatus 900 may include one or more processors 901. The processor 901 may be a general-purpose processor, a dedicated processor, or the like. For example, the processor 901 may be a baseband processor, a digital signal processor, an application-specific integrated circuit, a field programmable gate array or another programmable logic device, a discrete gate or a transistor logic device, a discrete hardware component, or a central processing unit (CPU). The baseband processor may be configured to process a communication protocol and communication data. The CPU may be configured to control the communication apparatus (for example, a base station, a baseband chip, a terminal, a terminal chip, a distributed unit (DU), or a central unit (CU)), execute a software program, and process data of the software program.

Optionally, the communication apparatus 900 may include one or more memories 902. The memory 902 may store instructions 904. The instructions may be run on the processor 901, so that the communication apparatus 900 performs the methods described in the foregoing method embodiments. Optionally, the memory 902 may further store data. The processor 901 and the memory 902 may be separately disposed, or may be integrated together.

The memory 902 may include but is not limited to a nonvolatile memory, for example, a hard disk drive (HDD) or a solid-state drive (SSD), a random-access memory (RAM), an erasable programmable read-only memory (EPROM), a ROM or a compact disc read-only memory (CD-ROM), or the like.

Optionally, the communication apparatus 900 may further include a transceiver 905 and an antenna 906. The transceiver 905 may be referred to as a transceiver unit, a transceiver machine, a transceiver circuit, or the like, and is configured to implement a transceiver function. The transceiver 905 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The communication apparatus 900 is a terminal device. The processor 901 is configured to perform S104 in the uplink timing method 100. The transceiver 905 is configured to perform S103 and S105 in the uplink timing method 100.

The communication apparatus 900 is a network device. The processor 901 is configured to perform S101 in the uplink timing method 100. The transceiver 905 is configured to perform S102 in the uplink timing method 100.

The communication apparatus 900 is an access network device. The transceiver 905 is configured to perform S106 in the uplink timing method 100.

In another possible design, the processor 901 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, optionally, the processor 901 may store instructions 903, and the instructions 903 are run on the processor 901, so that the communication apparatus 900 can perform the methods described in the foregoing method embodiments. The instructions 903 may be built into the processor 901. In this case, the processor 901 may be implemented by hardware.

In still another possible design, the communication apparatus 900 may include a circuit. The circuit may implement a sending, receiving, or communication function in the foregoing method embodiments. The processor and the transceiver described in embodiments of this application may be implemented on an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may alternatively be manufactured by using various IC technologies, for example, a complementary metal-oxide-semiconductor (CMOS), an N-channel metal-oxide-semiconductor (NMOS), a p-channel metal-oxide-semiconductor (PMOS), a bipolar junction transistor (BJT), a bipolar CMOS (BiCMOS), silicon germanium (SiGe), and gallium arsenide (GaAs).

The communication apparatus described in the foregoing embodiments may be a terminal device, a network device, or an access network device. However, a scope of the communication apparatus described in embodiments of this application is not limited thereto, and a structure of the communication apparatus may not be limited by FIG. 9. The communication apparatus may be an independent device or may be a part of a large device. For example, the communication apparatus may be:

(1) an independent integrated circuit IC, a chip, or a chip system or subsystem;

(2) a set that has one or more ICs, where optionally, the IC set may alternatively include a storage component configured to store data and instructions;

(3) an ASIC, for example, a modulator;

(4) a module that may be embedded in another device;

(5) a receiver machine, a terminal, an intelligent terminal, a cellular phone, a wireless device, a handheld device, a mobile unit, a vehicle-mounted device, a network device, a cloud device, an artificial intelligence device, or the like; or (6) others.

Figure 10:
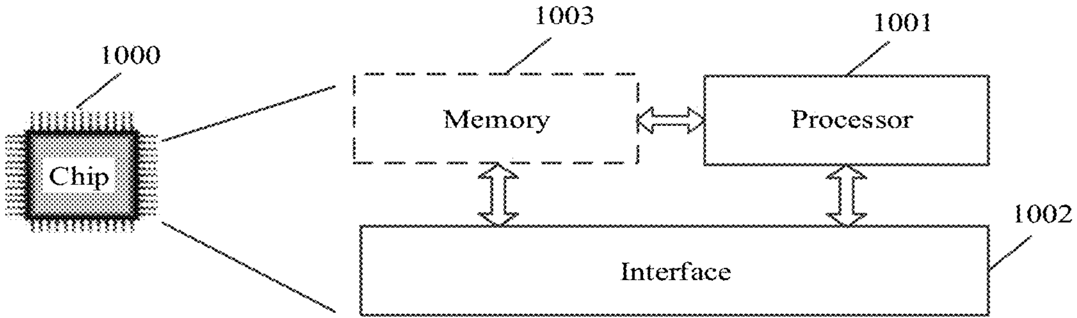
FIG. 10 is a diagram of a structure of a chip according to an embodiment of this application.

When the communication apparatus may be a chip or a chip system, refer to a diagram of a structure of a chip shown in FIG. 10. The chip 1000 shown in FIG. 10 includes a processor 1001 and an interface 1002. There may be one or more processors 1001, and there may be a plurality of interfaces 1002. The processor 1001 may be a logic circuit, and the interface 1002 may be an input/output interface, an input interface, or an output interface. The chip 1000 may further include a memory 1003.

In a design, when the chip is configured to implement functions of a terminal device in this embodiment of this application, the processor 1001 is configured to control the interface 1002 to perform output or receiving; the interface 1002 is configured to receive timing information; the processor 1001 is configured to determine a first uplink sending moment based on the timing information and a synchronization signal; and the interface 1002 is further configured to send an uplink signal to an access network device at the first uplink sending moment, where both the timing information and the synchronization signal are from a network device, and the access network device does not support downlink transmission.

This embodiment of this application and the foregoing method embodiment are based on a same concept, and bring same technical effect. For a specific principle, refer to the descriptions of the foregoing embodiment. Details are not described again.

In another design, when the chip is configured to implement functions of a network device in this embodiment of this application, the interface 1002 is configured to obtain timing information; the processor 1001 is configured to determine a first uplink sending moment based on the timing information; and the interface 1002 is configured to send an uplink signal to an access network device at the first uplink sending moment, where the timing information is from the network device, and the access network device does not support downlink transmission.

This embodiment of this application and the foregoing method embodiment are based on a same concept, and bring same technical effect. For a specific principle, refer to the descriptions of the foregoing embodiment. Details are not described again.

In another design, when the chip is configured to implement functions of a network device in this embodiment of this application, the processor 1001 is configured to determine timing information; and the interface 1002 is configured to send the timing information to a terminal device, where the timing information is used by the terminal device to determine a first uplink sending moment for sending an uplink signal to an access network device, and the access network device does not support downlink transmission.

This embodiment of this application and the foregoing method embodiment are based on a same concept, and bring same technical effect. For a specific principle, refer to the descriptions of the foregoing embodiment. Details are not described again.

In still another design, when the chip is configured to implement functions of an access network device in this embodiment of this application, the interface 1002 is configured to receive an uplink signal, where the access network device does not support downlink transmission; and the uplink signal is sent by a terminal device at a first uplink sending moment determined based on timing information and a synchronization signal, and the timing information and the synchronization signal are sent by a network device to the terminal device.

This embodiment of this application and the foregoing method embodiment are based on a same concept, and bring same technical effect. For a specific principle, refer to the descriptions of the foregoing embodiment. Details are not described again.

In still another design, when the chip is configured to implement functions of an access network device in this embodiment of this application, the interface 1002 is configured to receive an uplink signal, where the access device does not support downlink transmission, the uplink signal is sent by a terminal device at a first uplink sending moment determined based on timing information, and the timing information is sent by a network device to the terminal device.

This embodiment of this application and the foregoing method embodiment are based on a same concept, and bring same technical effect. For a specific principle, refer to the descriptions of the foregoing embodiment. Details are not described again.

In this embodiment of this application, the communication apparatus 900 and the chip 1000 may further perform the implementations described in the foregoing communication apparatus 800. A person skilled in the art may further understand that various illustrative logical blocks (illustrative logic blocks) and steps that are listed in embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it should not be considered that the implementation goes beyond the protection scope of embodiments of this application.

This embodiment of this application and the method embodiment shown in the uplink timing method 100 are based on a same concept, and bring same technical effect. For a specific principle, refer to the descriptions of the embodiment shown in the uplink timing method 100. Details are not described again.

This application further provides a computer-readable storage medium. The computer-readable storage medium stores a computer program or instructions, and the computer program or the instructions is/are used to implement the function in any one of the foregoing method embodiments.

This application further provides a computer program product, configured to store computer software instructions. When the instructions are executed by a communication apparatus, the function in any one of the foregoing method embodiments is implemented.

This application further provides a computer program. When the computer program is run on a computer, the function in any one of the foregoing method embodiments is implemented.

This application further provides a communication system. The system includes at least one terminal device, at least one network device, and at least one access network device in the foregoing aspects. In another possible design, the system may further include another device that interacts with the terminal device, the network device, and the access network device in the solutions provided in this application.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It should be understood that, an "embodiment" mentioned throughout this specification means that particular features, structures, or characteristics related to this embodiment are included in at least one embodiment of this application. Therefore, embodiments of the entire specification do not necessarily mean a same embodiment. In addition, these particular features, structures, or characteristics may be combined in one or more embodiments in any appropriate manner.

It should be further understood that ordinal numbers such as "first" and "second" mentioned in embodiments of this application are used to distinguish between a plurality of objects, but are not used to limit sizes, content, sequences, priorities, importance degrees, or the like of the plurality of objects.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more. "At least one item (piece)" or a similar expression thereof means one or more items (pieces), namely, any combination of these items, including any combination of singular items (pieces) or plural items (pieces). For example, at least one item (piece) of a, b, or c may represent a, b, c, a and b, a and c, b and c, or a, b, and c.

It should be understood that, unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It should be understood that the term "and/or" in this specification describes only an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. For example, A/B indicates A or B.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a terminal device and comprising:

receiving, from a network device, timing information and a synchronization signal; and sending, to an access network device that does not support downlink transmission, an uplink signal at a first uplink sending moment, wherein the first uplink sending moment is based on the timing information and the synchronization signal, wherein the timing information comprises at least one of a first time point or an offset, wherein the first time point is a start time point, of a downlink time unit, that is based on the synchronization signal, or an uplink timing reference point, for sending the uplink signal, is based on at least one of the first time point or the offset, wherein the uplink timing reference point is based on the first time point and the offset, wherein the offset is a time offset of the uplink timing reference point relative to the first time point, wherein the offset is based on a difference between a first path distance and a second path distance, wherein the first path distance is between the terminal device and the network device, and wherein the second path distance is between the terminal device and the access network device.

2. The method according to claim 1, wherein the timing information comprises a first timing advance (TA) of the first uplink sending moment relative to the first time point.

3. The method according to claim 2, wherein the timing information further comprises a second TA, wherein the second TA is of a second uplink sending moment relative to the first time point, and wherein the method further comprises sending a second uplink signal to the network device at the second uplink sending moment.

4. The method according to claim 2, wherein before receiving the timing information, the method further comprises sending a preamble to the access network device based on the first time point, and wherein the preamble determines the timing information.

5. An uplink timing apparatus, comprising:

a memory configured to store instructions; and one or more processors coupled to the memory and configured to execute the instructions to cause the uplink timing apparatus to:

receive, from a network device, timing information and a synchronization signal; and send, to an access network device that does not support downlink transmission, an uplink signal at a first uplink sending moment, wherein the first uplink sending moment is based on the timing information and the synchronization signal, wherein the timing information comprises at least one of a first time point or an offset, wherein the first time point is a start time point, of a downlink time unit, that is based on the synchronization signal, or an uplink timing reference point, for sending the uplink signal, is based on at least one of the first time point or the offset, wherein the uplink timing reference point is based on the first time point and the offset, wherein the offset is a time offset of the uplink timing reference point relative to the first time point, wherein the offset is based on a difference between a first path distance and a second path distance, wherein the first path distance is between the uplink timing apparatus and the network device, and wherein the second path distance is between the uplink timing apparatus and the access network device.

6. The uplink timing apparatus according to claim 5, wherein the timing information comprises a first timing advance (TA) of the first uplink sending moment relative to the first time point.

7. The uplink timing apparatus according to claim 6, wherein the timing information further comprises a second TA of a second uplink sending moment relative to the first time point, and wherein the one or more processors are further configured to execute the instructions to cause the uplink timing apparatus to send a second uplink signal to the network device at the second uplink sending moment.

8. The uplink timing apparatus according to claim 6, wherein the one or more processors are further configured to execute the instructions to cause the uplink timing apparatus to send a preamble to the access network device based on the first time point, and wherein the preamble is used by the network device or the access network device to determine the timing information.

9. A computer program product comprising instructions that are stored on a non-transitory computer-readable medium and that, when executed by one or more processors, cause an uplink timing apparatus to:

receive, from a network device, timing information and a synchronization signal; and send, to an access network device that does not support downlink transmission, an uplink signal at a first uplink sending moment, wherein the first uplink sending moment is based on the timing information and the synchronization signal, wherein the timing information comprises at least one of a first time point or an offset, wherein the first time point is a start time point, of a downlink time unit, that is based on the synchronization signal, or an uplink timing reference point, for sending the uplink signal, is based on at least one of the first time point or the offset, wherein the uplink timing reference point is based on the first time point and the offset, wherein the offset is a time offset of the uplink timing reference point relative to the first time point, wherein the offset is based on a difference between a first path distance and a second path distance, wherein the first path distance is between the uplink timing apparatus and the network device, and wherein the second path distance is between the uplink timing apparatus and the access network device.

10. The computer program product according to claim 9, wherein the timing information comprises a first timing advance (TA) of the first uplink sending moment relative to the first time point.

11. The computer program product according to claim 10, wherein the timing information further comprises a second TA of a second uplink sending moment relative to the first time point, and wherein the instructions, when executed by the one or more processors, further cause the uplink timing apparatus to send a second uplink signal to the network device at the second uplink sending moment.

12. The computer program product according to claim 10, wherein the one or more processors are further configured to execute the instructions to cause the uplink timing apparatus to send a preamble to the access network device based on the first time point, and wherein the preamble is used by the network device or the access network device to determine the timing information.

* * * * *